US008553293B2

(12) United States Patent
Tabata

(10) Patent No.: US 8,553,293 B2
(45) Date of Patent: Oct. 8, 2013

(54) IMAGE INTERPOLATION APPARATUS AND A COMPUTER READABLE STORAGE MEDIUM STORING INSTRUCTIONS OF A COMPUTER PROGRAM

(75) Inventor: Michio Tabata, Tokyo (JP)

(73) Assignee: Toshiba Design & Manufacturing Service Corporation, Fuchu-shi (JP)

( * ) Notice: Subject to any disclaimer, the term of this patent is extended or adjusted under 35 U.S.C. 154(b) by 755 days.

(21) Appl. No.: 12/769,985

(22) Filed: Apr. 29, 2010

(65) Prior Publication Data

US 2010/0290092 A1    Nov. 18, 2010

(30) Foreign Application Priority Data

May 12, 2009  (JP) ................................ P2009-115531
Mar. 1, 2010  (JP) ................................ P2010-043701

(51) Int. Cl.
*H04N 1/40* (2006.01)

(52) U.S. Cl.
USPC ........... 358/447; 358/443; 358/400; 345/606; 345/698; 382/300; 382/266; 382/264; 348/448; 348/406; 348/627; 348/452; 348/458

(58) Field of Classification Search
USPC ........ 358/1.18, 449, 447, 443, 400; 348/448, 348/606, 627, 452, 458, 625, 222.1; 345/606, 698; 382/300, 266, 264
See application file for complete search history.

(56) References Cited

U.S. PATENT DOCUMENTS

| 6,091,862 A * | 7/2000 | Okisu ........................... 382/300 |
| 6,570,616 B1 * | 5/2003 | Chen ............................. 348/272 |
| 2002/0080284 A1 * | 6/2002 | Kim et al. .................... 348/700 |
| 2003/0071917 A1 * | 4/2003 | Selby et al. ................... 348/452 |
| 2004/0257467 A1 * | 12/2004 | Nicolas ......................... 348/452 |
| 2006/0268168 A1 * | 11/2006 | Au et al. ....................... 348/448 |

FOREIGN PATENT DOCUMENTS

| JP | 8-149291 | 6/1996 |
| JP | 2007-142667 | 6/2007 |

* cited by examiner

*Primary Examiner* — Qian Yang
*Assistant Examiner* — Martin Mushambo
(74) *Attorney, Agent, or Firm* — Oblon, Spivak, McClelland, Maier & Neustadt, L.L.P.

(57) ABSTRACT

An image interpolation apparatus includes an extracting unit, temporal interpolation calculators, pattern matching units, and an output unit. The extracting unit extracts pixels around the missing pixels in order to form a basic frame and comparative frames. Each temporal interpolation calculator corresponds to each comparative frame, and calculates a temporal interpolated pixel for each comparative frame based on signal levels and variation of the signal levels. Each pattern matching unit corresponds to each comparative frame, inserts the temporal interpolated pixel of each comparative frame to the missing pixel, calculates difference of between each of the pixels in the basic frame and each of the corresponding pixels in the comparative frame, and sums up the differences for all pixels in absolute value to obtain sums for all comparative frames respectively. The output unit outputs the temporal interpolated pixel having a minimum sum among the sums as a final interpolated pixel.

25 Claims, 27 Drawing Sheets

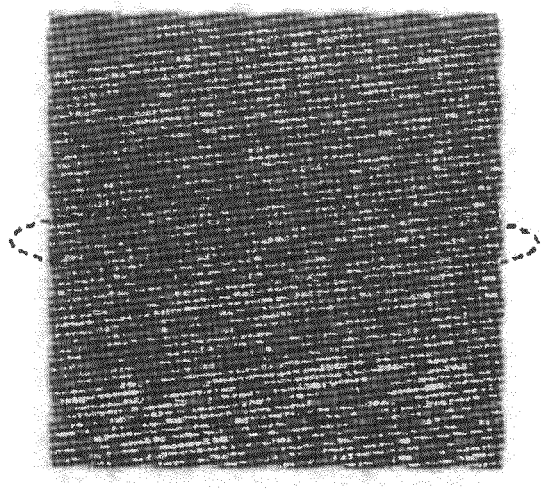
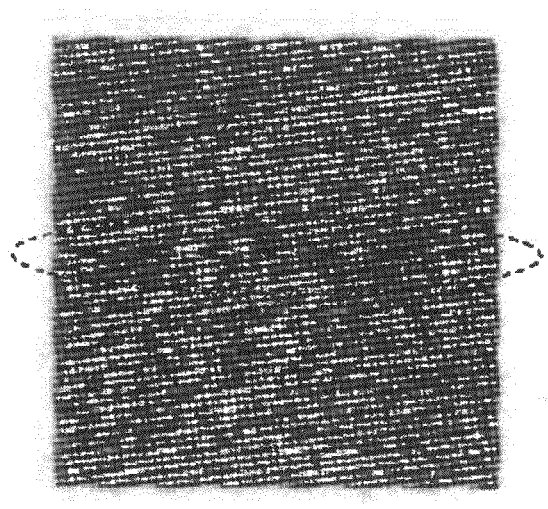
FIG.9

| 0 | 1 | 0 |
|---|---|---|
| 0 | -1 | 0 |
| 0 | 0 | 0 |

| 0 | 1 | 0 |
|---|---|---|
| 0 | −2 | 0 |
| 0 | 1 | 0 |

IMAGE INTERPOLATION APPARATUS AND A COMPUTER READABLE STORAGE MEDIUM STORING INSTRUCTIONS OF A COMPUTER PROGRAM

CROSS-REFERENCE TO RELATED APPLICATIONS

This application is based upon and claims the benefit of priority from the Japanese Patent Application No. 2010-043701, filed on Mar. 1, 2010, and the Japanese Patent Application No. 2009-115531, filed on May 12, 2009, the entire contents of which are incorporated herein by reference.

BACKGROUND

1. Field

The present invention relates to an image interpolation apparatus and A computer readable storage medium storing instructions of a computer program.

2. Description

A contact image sensor (CIS) is used as an image scanner for an image forming device (MFP) such as a copy machine, a facsimile machine and a scanner. The contact image sensor is formed by CCD (Charge Coupled Device). The contact image sensor is a sensor having a same magnification. Therefore, the contact image sensor preferably has a length which is longer than a length of a paper to be scanned. In general, an image scan sensor is formed by connecting some contact image sensors on a printed circuit board.

However, since an interval between two adjacent contact image sensors becomes shorter with increasing resolution, a pixel which exists between the contact image sensors may miss being scanned.

FIG. 21 is a figure illustrating an image scan sensor which is formed by connecting some contact image sensors, which each contact image sensor has CCD on a printed circuit board.

In FIG. 21, a first contact image sensor 10a and a second contact image sensor 10b are connected to provide an image scan sensor 10. Number of the contact image sensors is not limited to two and it may be more than three. The pixel which exists between the contact image sensors is interpolated by an operation. Image scan elements 20 are arranged with an interval in a line in each contact image sensor 10a, 10b.

The image scan elements 20 are corresponding pixels a1-a9, respectively. A missing pixel X exists between the contact image sensors 10a and Mb. In FIG. 21, pixels a1-a9 and pixels b1-b9 which are respectively located on both sides of the missing pixel X are illustrated.

One of techniques to interpolate the missing pixel X is disclosed in JP-A 2007-142667 (KOKAI). In this reference, a determination unit determines whether the missing pixel is located in a halftone dot area or a non-halftone dot area.

If the determination unit determines that the missing pixel is located in the non-halftone dot area, the missing pixel is interpolated by a linear interpolation. On the other hand, if the determination unit determines that the missing pixel is located in the halftone dot area, the missing pixel is interpolated by a pattern matching.

This reference adopts a method described in JP-A PH8-149291(KOKAI) to determine whether the missing pixel is located in the halftone dot area or the non-halftone dot area. However, this method may cause increasing a size of the image forming device and cost.

Moreover, in the JP-A 2007-142667 (KOKAI), a missing pixel in a basic pattern is replaced to a corresponding pixel (edge pixel) in a comparative pattern as a temporal interpolation pixel before operating the pattern matching. However, since difference of signal levels between the basic pattern and the comparative pattern is not considered, accuracy of the temporal interpolation pixel is low. Also, since accuracy of the pattern matching is low, an interpolation pixel after the pattern matching may stray from a true pixel.

Accordingly, an object of the invention is to provide an image interpolation apparatus that the missing pixel is interpolated with higher accuracy without the determination unit which determines whether the missing pixel is located in the halftone dot area or the non-halftone dot area.

Moreover, other object of the invention is to provide an image interpolation apparatus that improves accuracy of the pattern matching by replacing the missing pixel in the basic pattern to the temporal interpolation pixel which is calculated from the signal levels and variation of the signal levels based on pixels around the missing pixel in the basic pattern and the comparative pattern.

SUMMARY

According to one aspect of the invention, an image interpolation apparatus formed by connecting contact image sensors to interpolate a missing pixel, each of the contact image sensors being formed by arranging scan elements in a line, the missing pixel existing between the contact image sensors, includes an extracting unit for extracting pixels around the missing pixels in order to form a basic frame and comparative frames, the basic frame being formed by at least three pixels including the missing pixel, the missing pixel is located at head or tail of the pixels in the basic frame, each of the comparative frames including same number of the pixels as the basic frame, at least one pixel of the pixels in one comparative frame does not overlap to the pixels in the other comparative frames;

temporal interpolation calculators, each temporal interpolation calculator corresponding to each of the comparative frames, and calculating a temporal interpolated pixel for each of the comparative frames based on signal levels and variation of the signal levels in terms of a first pixel group and a second pixel group, the first pixel group including adjacent pixels of the missing pixel in the basic frame, the second pixel group including an edge pixel corresponding to the missing pixel and adjacent pixels of the edge pixel in the comparative frame;

pattern matching units, each pattern matching unit corresponding to each of the comparative frames, and inserting the temporal interpolated pixel of each comparative frame to the missing pixel, calculating difference of between each of the pixels in the basic frame and each of the corresponding pixels in the comparative frame, and summing up the differences for all pixels in absolute value to obtain sums for all comparative frames respectively; and an output unit outputting the temporal interpolated pixel having a minimum sum among the sums as a final interpolated pixel.

According to other aspect of the invention, an image interpolation apparatus formed by connecting contact image sensors to interpolate a missing pixel, each of the contact image sensors being formed by arranging scan elements in a line, the missing pixel existing between the contact image sensors, includes an extracting unit for extracting pixels around the missing pixels in order to form a basic frame and comparative frames, the basic frame being formed by at least three pixels including the missing pixel, the missing pixel is located at head or tail of the pixels in the basic frame, each of the comparative frames including same number of the pixels as the basic frame, at least one pixel of the pixels in one comparative frame does not overlap to the pixels in the other comparative frames;

temporal interpolation calculators, each temporal interpolation calculator corresponding to each of the comparative frames, and calculating a temporal interpolated pixel for each of the comparative frames based on signal levels and variation of the signal levels in terms of a first pixel group and a second pixel group, the first pixel group including adjacent pixels of the missing pixel in the basic frame, the second pixel group including an edge pixel corresponding to the missing pixel and adjacent pixels of the edge pixel in the comparative frame;

pattern matching units, each pattern matching unit corresponding to each of the comparative frames, inserting the temporal interpolated pixel of each comparative frame to the missing pixel, calculating difference of between each of the pixels in the basic frame and each of the corresponding pixels in the comparative frame, and summing up the differences for all pixels in absolute value to obtain sums for all comparative frames respectively;

a minimum detection unit for selecting a minimum sum among the sums outputted from the pattern matching units;

a linear interpolation unit for calculating a linear interpolated pixel according to a gradient of the pixels which exist in both side of the missing pixel; and a switching unit outputting the temporal interpolated pixel from the minimum detection unit as a final interpolated pixel if the minimum sum from the minimum detection unit is smaller than a threshold, and outputting the linear interpolated pixel from the linear interpolation unit as the final interpolated pixel, if the minimum sum from the minimum detection unit is larger than the threshold.

According to other aspect of the invention, an image interpolation apparatus formed by connecting contact image sensors to interpolate a missing pixel, each of the contact image sensors being formed by arranging scan elements in a line, the missing pixel existing between the contact image sensors, comprising:

an extracting unit for extracting pixels around the missing pixels in order to form a basic frame and comparative frames, the basic frame being formed by at least three pixels including the missing pixel, the missing pixel is located at head or tail of the pixels in the basic frame, each of the comparative frames including same number of the pixels as the basic frame, at least one pixel of the pixels in one comparative frame does not overlap to the pixels in the other comparative frames;

temporal interpolation calculators, each temporal interpolation calculator corresponding to each of the comparative frames, and calculating a temporal interpolated pixel for each of the comparative frames based on signal levels and variation of the signal levels in terms of a first pixel group and a second pixel group, the first pixel group including adjacent pixels of the missing pixel in the basic frame, the second pixel group including an edge pixel corresponding to the missing pixel and adjacent pixels of the edge pixel in the comparative frame;

pattern matching units, each pattern matching unit corresponding to each of the comparative frames, inserting the temporal interpolated pixel of each comparative frame to the missing pixel, calculating difference of between each of the pixels in the basic frame and each of the corresponding pixels in the comparative frame, and summing up the differences for all pixels in absolute value to obtain sums for all comparative frames respectively:

a minimum detection unit for selecting a minimum sum among the sums outputted from the pattern matching units;

a linear interpolation unit for calculating a linear interpolated pixel according to a gradient of the pixels which exist in both side of the missing pixel;

a level difference calculator calculating an average value of the pixels which exist in one side of the missing pixel and another average value of the pixels which exist in another side of the missing pixel, and calculating and outputting difference of the average values as a difference of signal levels; and a switching unit outputting the temporal interpolated pixel from the minimum detection unit as a final interpolated pixel if the difference of the signal levels is smaller than a threshold, and outputting the linear interpolated pixel from the linear interpolation unit as the final interpolated pixel, if the difference of the signal levels is larger than the threshold.

According to other aspect of the invention, a computer readable storage medium storing instructions of a computer program for interpolating a missing pixel in an image interpolation apparatus, the interpolation device formed by connecting contact image sensors, each of the contact image sensors being formed by arranging scan elements in a line, the missing pixel existing between the contact image sensors, the computer program which when executed by a computer results in performance of steps includes a first program module for instructing a computer to extract pixels around the missing pixels in order to form a basic frame and comparative frames, the basic frame being formed by at least three pixels including the missing pixel, the missing pixel is located at head or tail of the pixels in the basic frame, each of the comparative frames including same number of the pixels as the basic frame, at least one pixel of the pixels in one comparative frame does not overlap to the pixels in the other comparative frames;

a second program module for instructing the computer to calculate a temporal interpolated pixel for each of the comparative frames based on signal levels and variation of the signal levels in terms of a first pixel group and a second pixel group, the first pixel group including adjacent pixels of the missing pixel in the basic frame, the second pixel group including an edge pixel corresponding to the missing pixel and adjacent pixels of the edge pixel in the comparative frame;

a third program module for instructing the computer to insert the temporal interpolated pixel of each comparative frame to the missing pixel, calculate difference of between each of the pixels in the basic frame and each of the corresponding pixels in the comparative frame, and sum up the differences for all pixels in absolute value to obtain sums for all comparative frames respectively; and a fourth program module for instructing the computer to output the temporal interpolated pixel having a minimum sum among the sums as a final interpolated pixel.

BRIEF DESCRIPTION OF THE DRAWINGS

FIG. 9 is a picture using the interpolations of the first embodiment and the conventional technique;

FIG. 16A is a figure explaining a first derivation filter;

FIG. 16B is a figure explaining a second derivation filter;

DETAILED DESCRIPTION

The embodiments will be explained with reference to the accompanying drawings.

Figure 1:
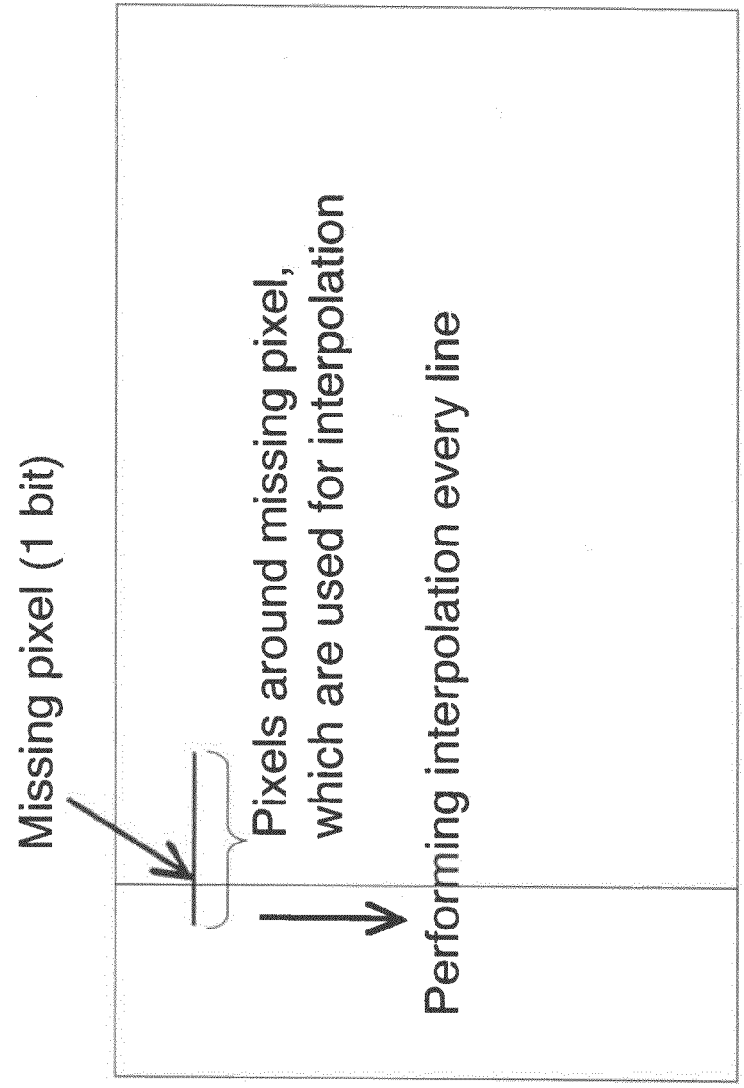
FIG. 1 is a figure showing an interpolation of a frame scanned by a contact image sensor.

FIG. 1 is a figure showing an interpolation of a frame scanned by a contact image sensor. In the embodiments, a pattern matching is performed with respect to each line in a horizontal direction (main scanning direction). The missing pixel is interpolated based on the pixels in the line including the missing pixel. Similarly, the other missing pixel in other line is interpolated based on the pixels in the other line. This interpolation is repeated along a vertical direction (sub-scanning direction).

(Fundamental Operation)

Figure 2:
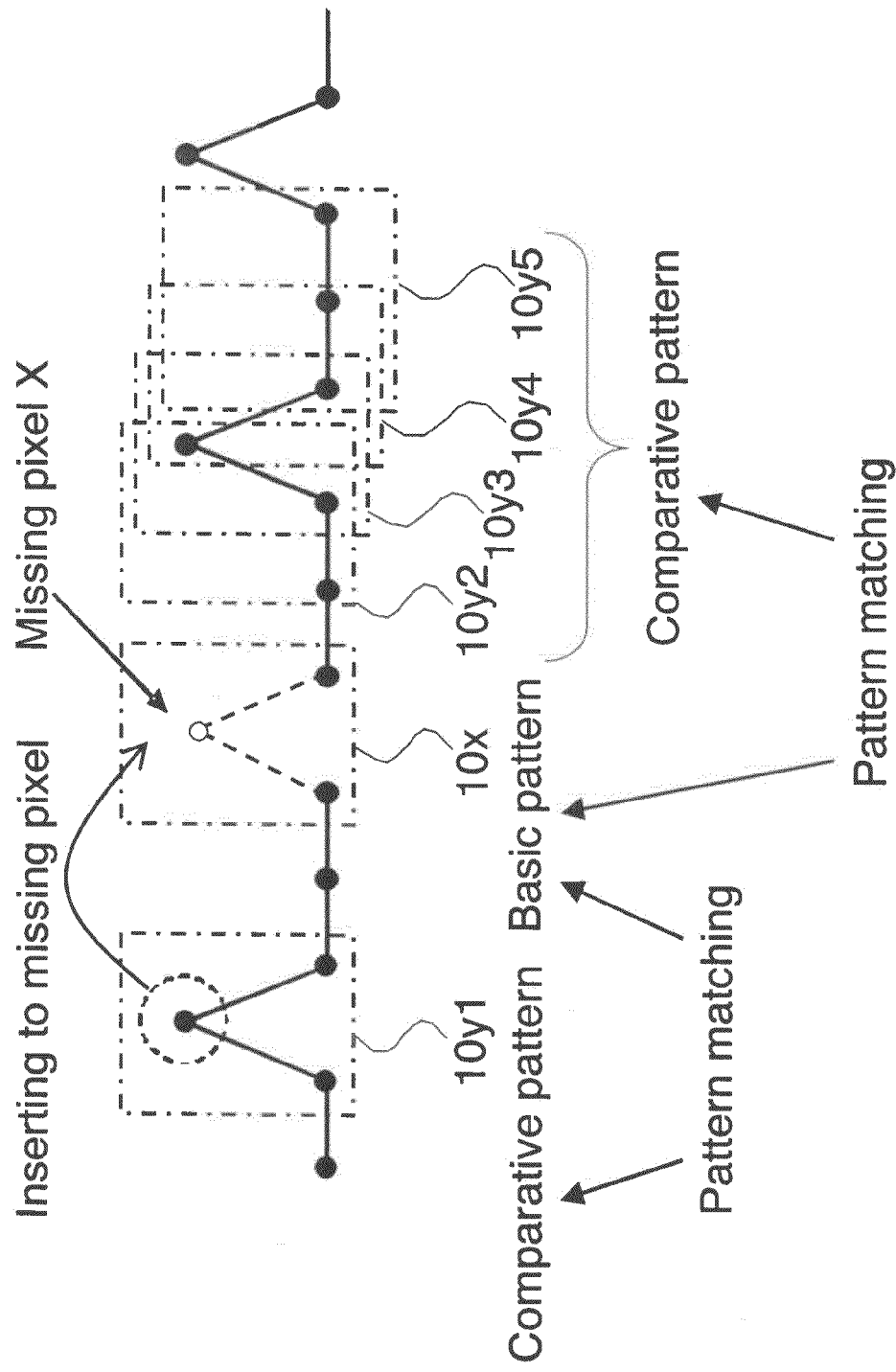
FIG. 2 is a figure explaining fundamental operation of the pattern matching.

Next, we will explain a fundamental operation. FIG. 2 is a figure explaining the fundamental operation of the pattern matching. In the explanation, the pattern matching is performed using three pixels.

As shown in FIG. 2, a basic pattern $10x$ includes the missing pixel X and two pixels around the missing pixel X. Similarly, each of comparative patterns $10y1$, $10y2$, $10y3$, $10y4$, $10y5$, . . . includes three pixels. The basic pattern $10x$ is compared with each of the comparative patterns $10y1$, $10y2$, $10y3$, $10y4$, $10y5$, . . . in the pattern matching. The missing pixel X in the basic pattern $10x$ is replaced to the corresponding pixel in each of the comparative patterns $10y1$, $10y2$, $10y3$, $10y4$, $10y5$, . . . as a temporal interpolated pixel. During the pattern matching, if the basic pattern has the best match with one of the comparative patterns $10y1$, $10y2$, $10y3$, $10y4$, $10y5$, . . . , the temporal interpolated pixel is adopted as a final interpolated pixel.

In addition to the fundamental operation, the embodiments have features (1)~(3) described below.

(1) In the pattern matching, the missing pixel X is located at head or tail of the basic pattern $10x$. Therefore, accuracy of the pattern matching is improved by forming consecutive data. In the pattern matching, first, the missing pixel X may be located at the head of the basic pattern $10x$ and the interpolation of the missing pixel X is performed to obtain a first interpolated pixel. Then, the missing pixel X may be located at the tail of the basic pattern $10x$ and the interpolation of the missing pixel X is performed to obtain a second interpolated pixel. After that, the first or second interpolated pixel which has better quality is selected according to the results of the interpolations. On the other hand, first, the missing pixel X may be located at the tail of the basic pattern $10x$, and then, the missing pixel X may be located at the head of the basic pattern $10x$.

Figure 3:
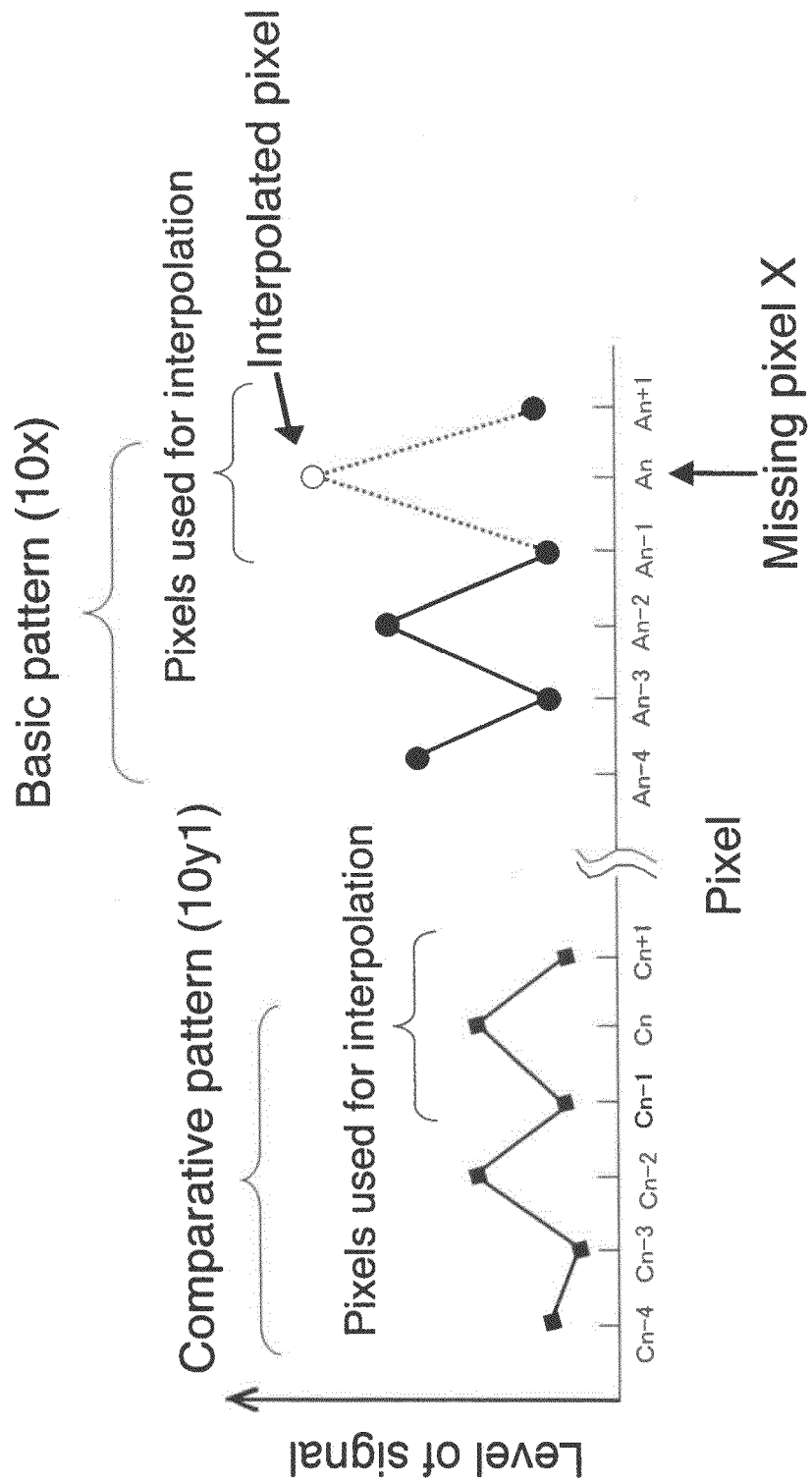
FIG. 3 is a figure explaining operation of the interpolation.

FIG. 3 is a figure explaining the interpolation in the case that the missing pixel X is located at the tail ($A_n$) of the basic pattern $10x$. The basic pattern $10x$ includes five pixels $A_{n-4} \sim A_n$. However, the missing pixel X may be located at the head ($A_{n-4}$) instead of the tail ($A_n$).

(2) Before performing the pattern matching, the missing pixel X in the basic pattern is temporarily interpolated using the pixels ($A_{n-1}$, $A_{n+1}$) which are adjacent and located at both sides of the missing pixel X, respectively. Moreover, the missing pixel X in the comparative pattern (which is, for example, the comparative pattern $10y1$) temporarily interpolated using the pixels ($C_{n-1}$, $C_n$, $C_{n+1}$), where the pixel ($C_n$) is corresponding to the missing pixel X of the basic pattern and the pixels ($C_{n-1}$, $C_{n+1}$) which are adjacent and located at both sides of the pixel ($C_n$), respectively. A missing pixel X is calculated from signal levels and variation of the signal levels based on the pixels ($A_{n-1}$, $A_{n+1}$) in the basic pattern and the pixels ($C_{n-1}$, $C_n$, $C_{n+1}$) in the comparative pattern. Then, the missing pixel X is replaced to the temporal interpolated pixel.

The accuracy of the pattern matching is improved by replacing the missing pixel X ($A_n$) in the basic pattern with the temporal interpolated pixel which is calculated from the signal levels and variation of the signal levels based on the pixels around the missing pixel X. Moreover, since the temporal interpolated pixel is adopted as the final interpolated pixel, the accuracy of the interpolation is also improved.

Figure 4:
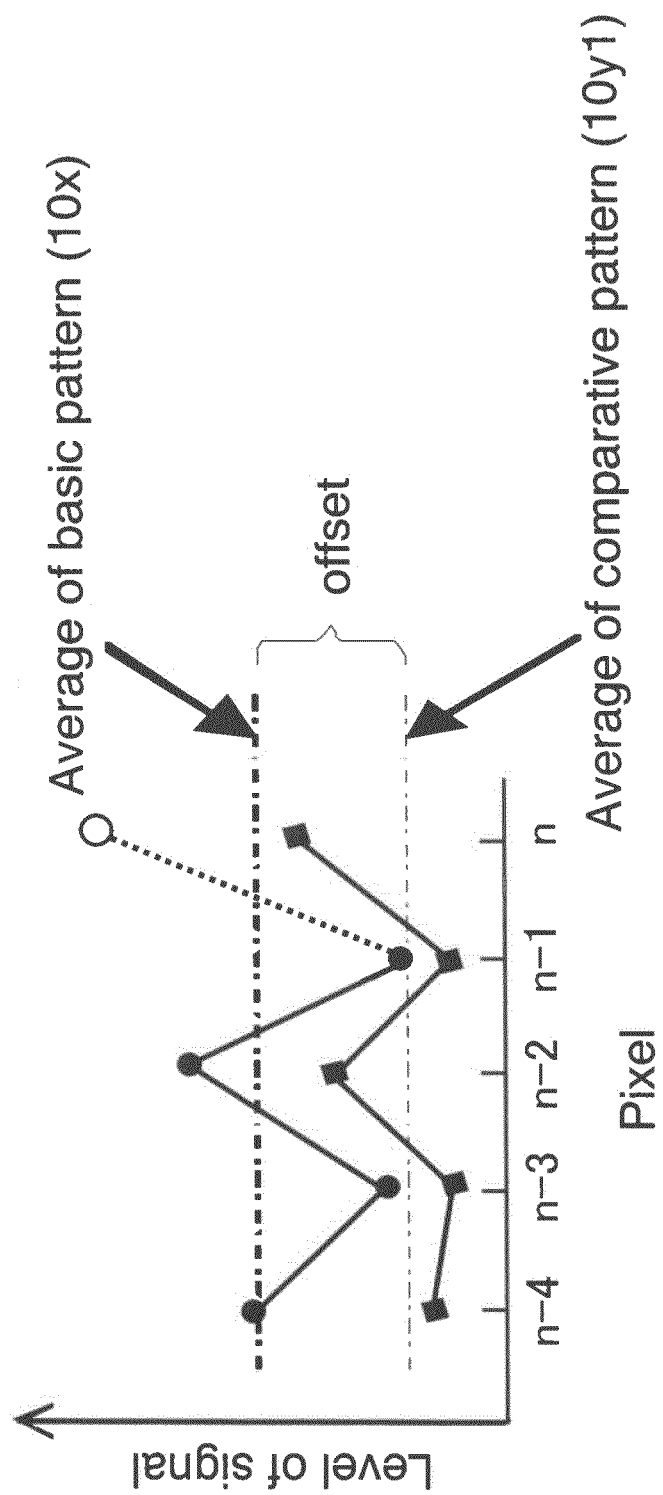
FIG. 4 is a figure explaining an offset between the basic pattern and the comparative pattern.

(3) In the pattern matching, differences between the basic pattern and the comparative pattern are summed up in absolute value. The differences are calculated about each of the pixels ($A_{n-4}$, $A_{n-3}$, $A_{n-2}$, $A_{n-1}$, $A_n$) in the basic pattern $10x$ and each of the corresponding pixels ($C_{n-4}$, $C_{n-3}$, $C_{n-2}$, $C_{n-1}$, $C_n$) in the comparative pattern $10y1$, respectively. The missing pixel X ($A_n$) in the basic pattern $10x$ is temporarily interpolated by the above operation (2). As shown in FIG. 4, the signal level of the basic pattern is adjusted by an offset "Voff" in order to match the signal levels between the basic pattern and the comparative pattern before summing up the differences between the basic pattern and the comparative pattern. The offset "Voff" is calculated from difference between average signal levels of the basic and the comparative patterns.

In the pattern matching described in (3), the smallest sum of the difference may mean the highest matching between the basic pattern and the comparative pattern. Therefore, the temporal interpolated pixel in the pattern having the highest matching is adopted as the final interpolated pixel.

Next, we will explain matching level of the pattern matching.

Figure 5:
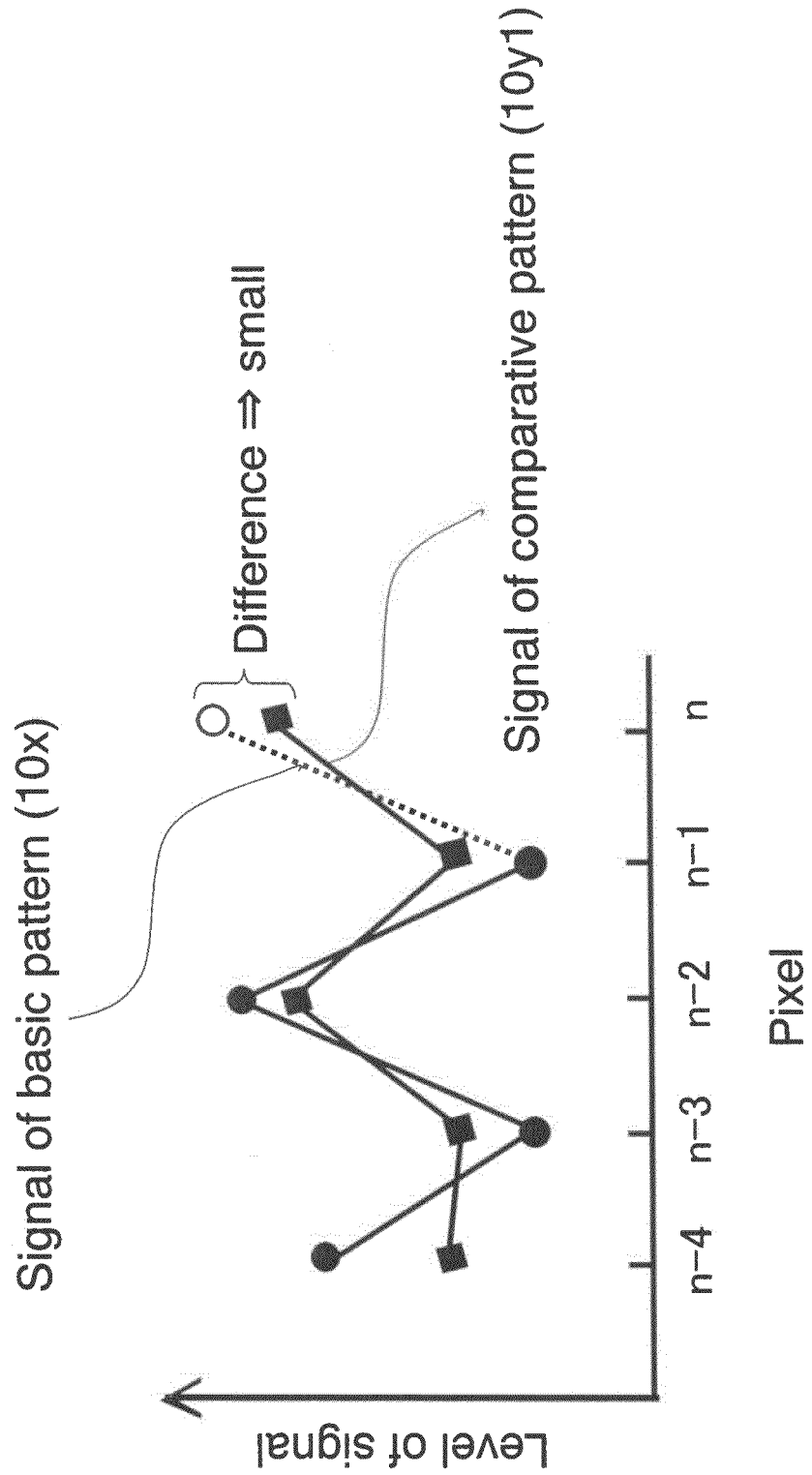
FIG. 5 is a figure showing an example of the signal levels which are having a high matching.
Figure 6:
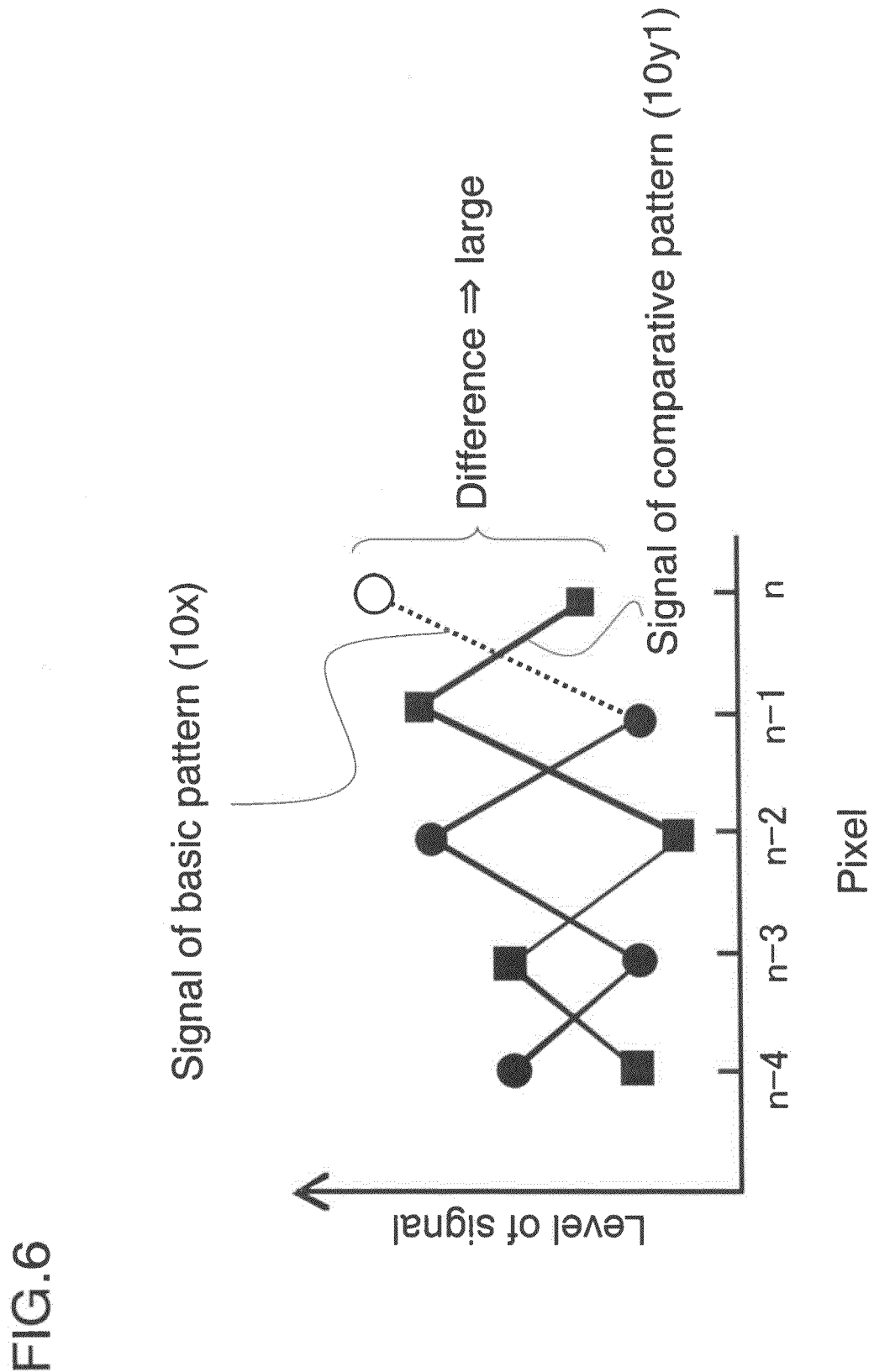
FIG. 6 is a figure showing an example of the signal levels which are having a high matching.

FIG. 5 is a figure showing an example of the signal levels of the basic pattern 10x and the comparative pattern 10y1, which are having a high matching. Both basic pattern 10x and comparative pattern 10y1 include five pixels, respectively. On the other hand, FIG. 6 is a figure showing an example of the signal levels of the basic pattern 10x and the comparative pattern 10y1, which are having a low matching.

Description of the First Embodiment

Hereinafter, the first embodiment will be explained with reference to FIGS. 7 to 12.

Figure 7:
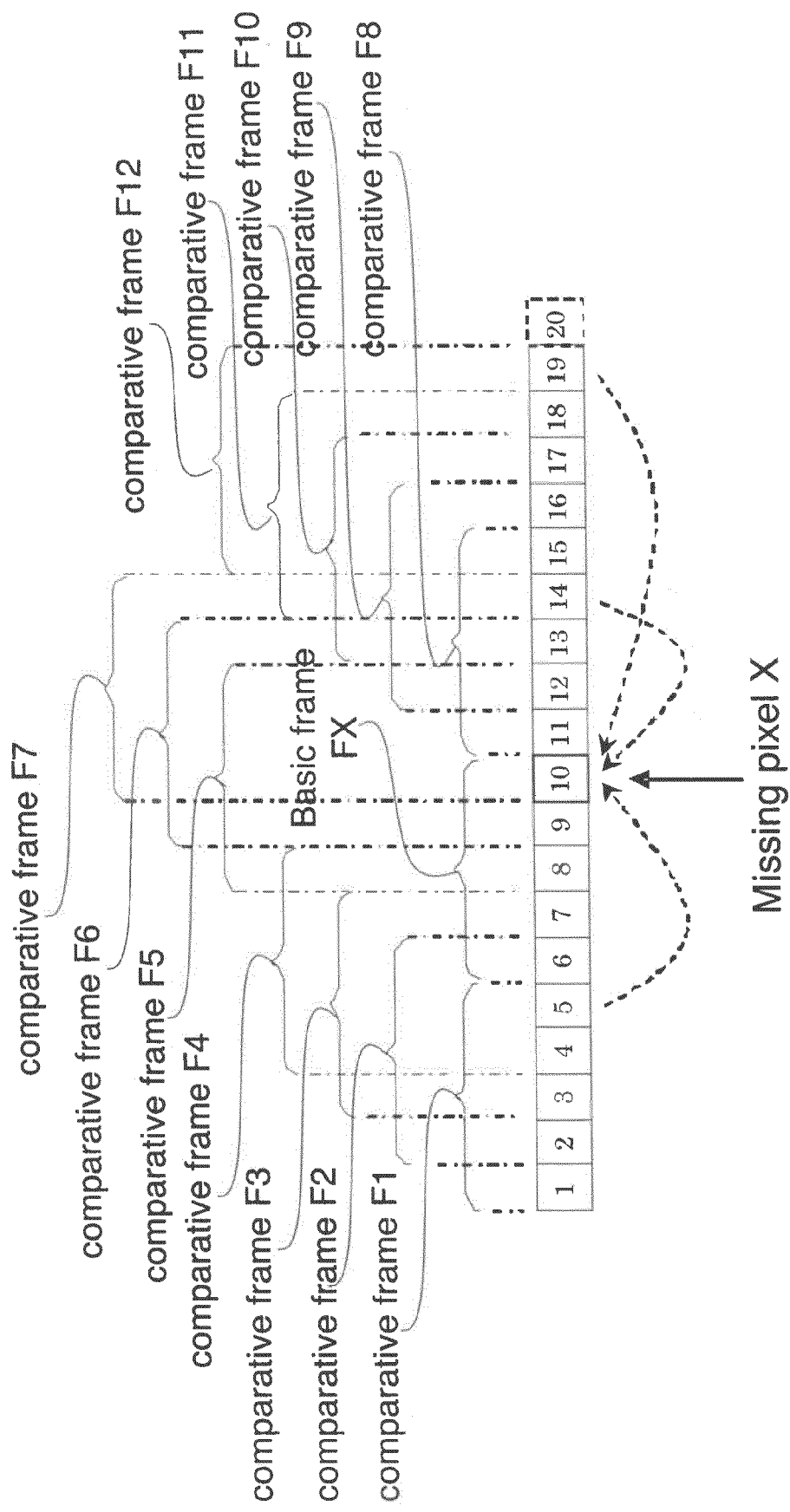
FIG. 7 is a figure showing positions of the basic pattern and the comparative patterns.

FIG. 7 is a figure showing positions of the basic pattern (basic frame) and the comparative patterns (comparative frames).

Twenty pixels 1~20 are illustrated in a line in FIG. 7. The pixels 1~19 are scanned by an image scanner element (not shown). The pixel 10 is the missing pixel X. If the missing pixel X is located at a tail of the basic frame, the basic frame FX includes the pixels 6~10. Number of the pixels included in the basic frame is not limited to three, but at least three pixels are preferably included in the basic frame. On the other hand, the comparative frames exist around the basic frame FX as shown in FIG. 7.

An example case, that the search range including pixels 1~19 except the pixel 10 (missing pixel X) is searched by the comparative frames F1~F12 for the pattern matching, is considered. Each of the basic and comparative frames includes five pixels. At least one pixel in each comparative frame does not overlap to other comparative frame. Number of the comparative frames is not limited. In this case, the pattern matching is performed from the comparative frame F1 to the comparative frame F12.

The comparative frames F2 to F12 are obtained by sliding the comparative frames F1 to F11 by one pixel. The tail pixel of each of the comparative frames F1 to F12 is corresponding to each of the pixels 5~19. However, the pixels 9~11 around the missing pixel 10 are not adopted as the tail pixels of the comparative frames. This is because that the missing pixel 10 is empty before performing the temporal interpolation. Since the tail bit of the comparative frame and adjacent pixels at the both side of the tail bit are used to interpolate the missing pixel, if these pixels are including the missing pixel 10, the temporal interpolation may not be performed accurately.

Accordingly, the comparative frame F1 includes the pixels 1~5, the comparative frame F2 includes the pixels 2~6, the comparative frame F3 includes the pixels 3~7, the comparative frame F4 includes the pixels 4~8, the comparative frame F5 includes the pixels 8~12, the comparative frame F6 includes the pixels 9~13, the comparative frame F7 includes the pixels 10~14, the comparative frame F8 includes the pixels 11~15, the comparative frame F9 includes the pixels 12~16, the comparative frame F10 includes the pixels 13~17, the comparative frame F11 includes the pixels 14~18, and the comparative frame F12 includes the pixels 15~19.

Next, we will explain operations of the temporal interpolation and the pattern matching (following Step 1~Step 3).

The missing pixel X ($A_n$) in the basic frame FX is temporarily interpolated by using the adjacent pixels ($A_{n-1}, A_{n+1}$) of the missing pixel X ($A_n$) in the basic frame FX and the pixels ($C_{n-1}, C_n, C_{n+1}$) in the comparative frame Fi (i=1~12). The temporal interpolated pixel is calculated according to the signal levels of the pixels in the basic frame FX and in the comparative frame and variation of the signal levels. Then, the temporal interpolated pixel is provided to the missing pixel X ($A_n$) in the basic frame FX.

In the temporal interpolation, equations to calculate the temporal interpolated pixel are selected according to the signal levels and variation of the signal levels to improve accuracy of the interpolation. FIGS. 8A~8F are figures showing examples of the signal levels and variation of the signal levels.

<Step 1>

Figure 8A:
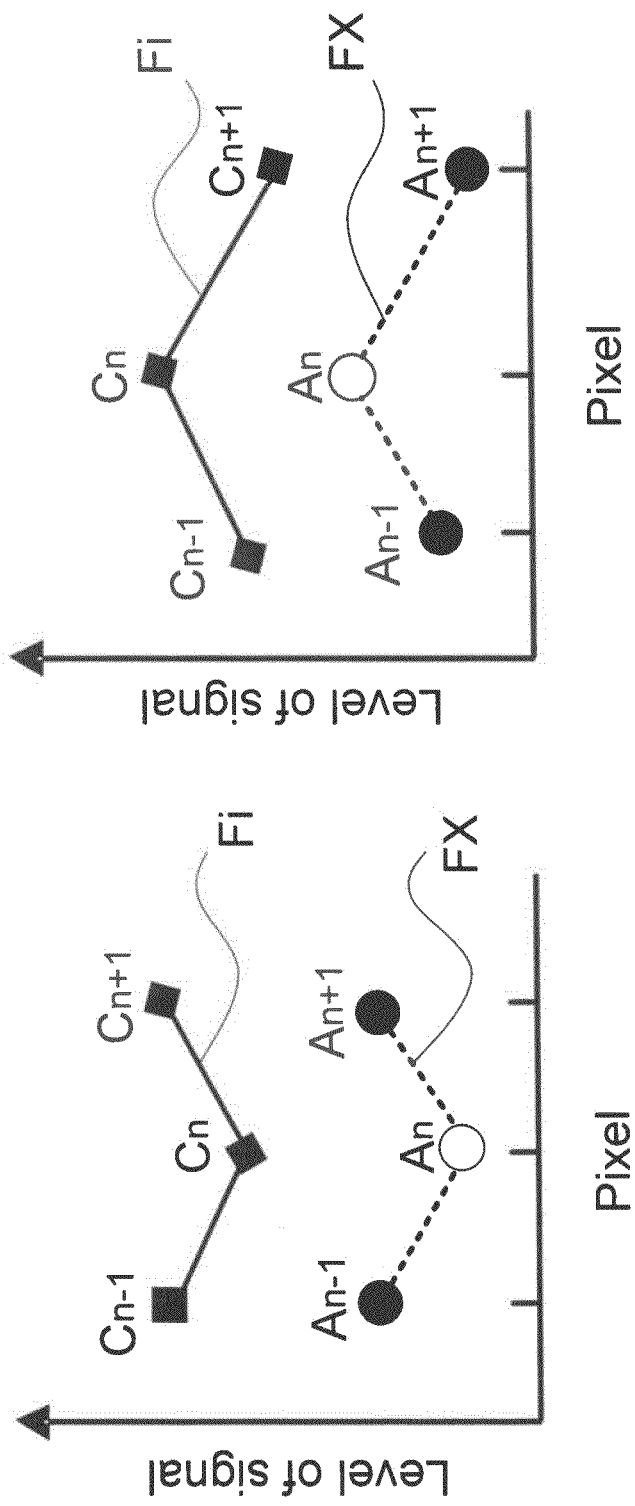
FIG. 8A is a figure showing an example case that the variation of the pixels in the comparative frame is no continuous and has concavo-convex shape.

FIG. 8A shows an example case that the variation of the pixels ($C_{n-1}, C_n, C_{n+1}$) in the comparative frame Fi is not continuous and has a concavo-convex shape. Moreover, the signal level of the comparative frame Fi ($C_{n-1}, C_n, C_{n+1}$) is larger than the signal level of the basic frame FX ($A_{n-1}, A_{n+1}$). In this case, an expression (1) is used for the temporal interpolation.

$$A_n = C_n \times (A_{n-1} + A_{n+1})/(C_{n-1} + C_{n+1}) \tag{1}$$

Figure 8B:
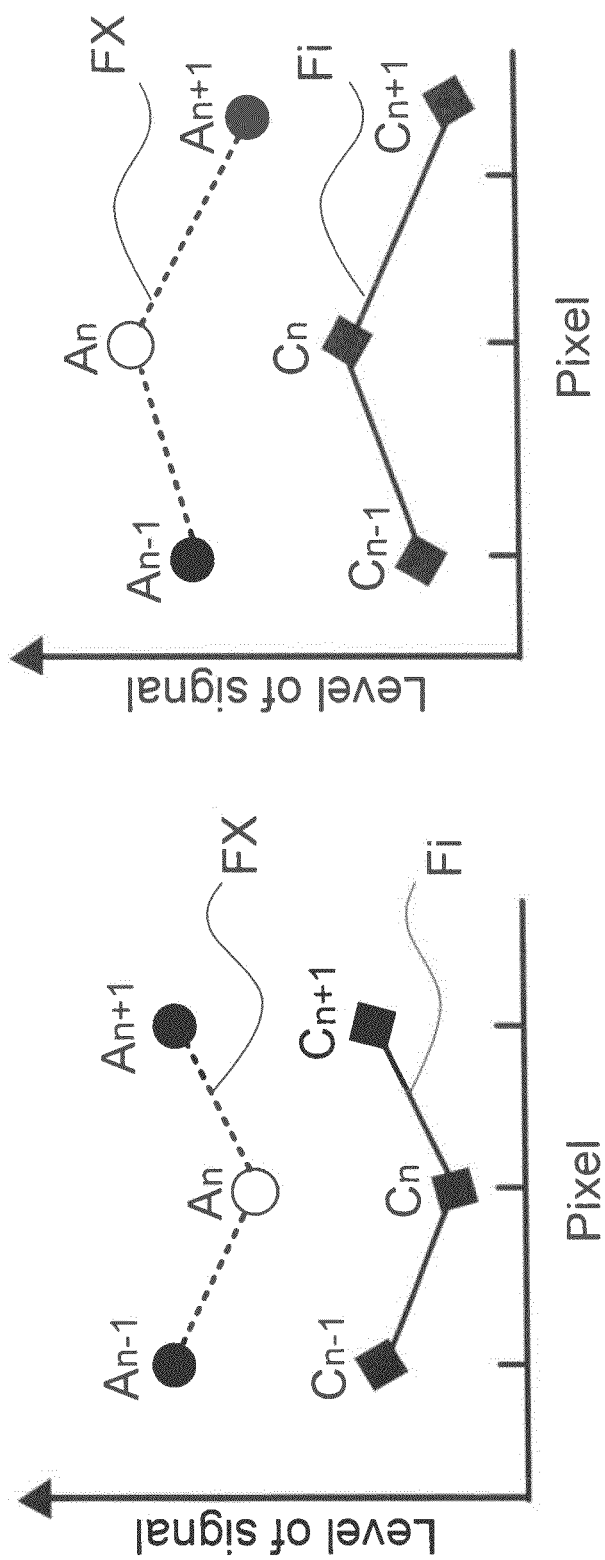
FIG. 8B is a figure showing an example case that the variation of the pixels in the comparative frame is no continuous and has a concavo-convex shape.

FIG. 8B shows an example case that the variation of the pixels ($C_{n-1}, C_n, C_{n+1}$) in the comparative frame Fi is not continuous and has a concavo-convex shape. Moreover, the signal level of the comparative frame Fi ($C_{n-1}, C_n, C_{n+1}$) is smaller than the signal level of the basic frame FX ($A_{n-1}, A_{n+1}$). In this case, an expression (2) is used for the temporal interpolation.

$$A_n = (C_n + (A_{n-1} + A_{n+1})/2) \times (A_{n-1} + A_{n+1})/(C_{n-1} + C_{n+1} + A_{n-1} + A_{n+1}) \tag{2}$$

Figure 8C:
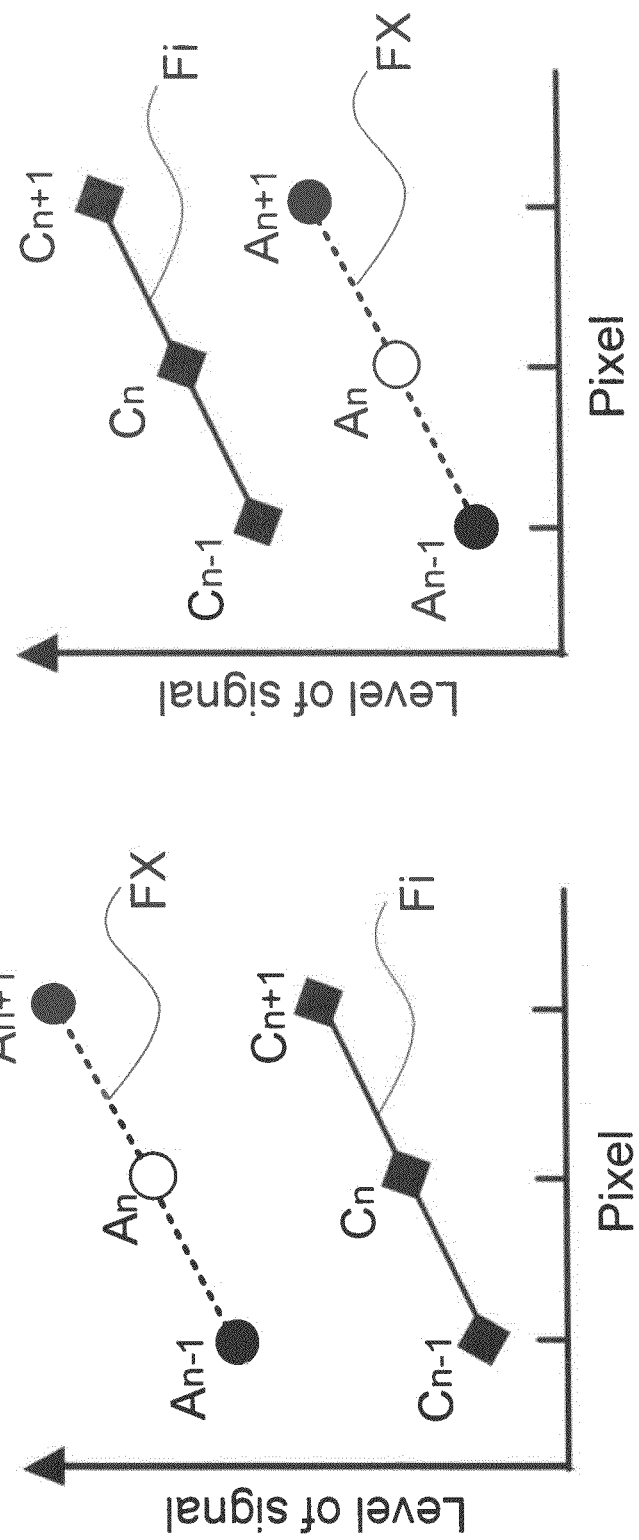
FIG. 8C is a figure showing an example case that the variation of the pixels in the comparative frame is continuous and has a sloping shape.

FIG. 8C shows an example case that the variation of the pixels ($C_{n-1}, C_n, C_{n+1}$) in the comparative frame Fi is continuous and has a sloping shape. Moreover, the signal level fills ($A_{n-1} < A_{n+1}$) and ($C_{n-1} < C_{n+1}$). In this case, an expression (3) is used for the temporal interpolation.

$$A_n = (C_n - C_{n-1}) \times (A_{n+1} - A_{n-1})/(C_{n+1} - C_{n-1}) + A_{n-1} \tag{3}$$

Figure 8D:
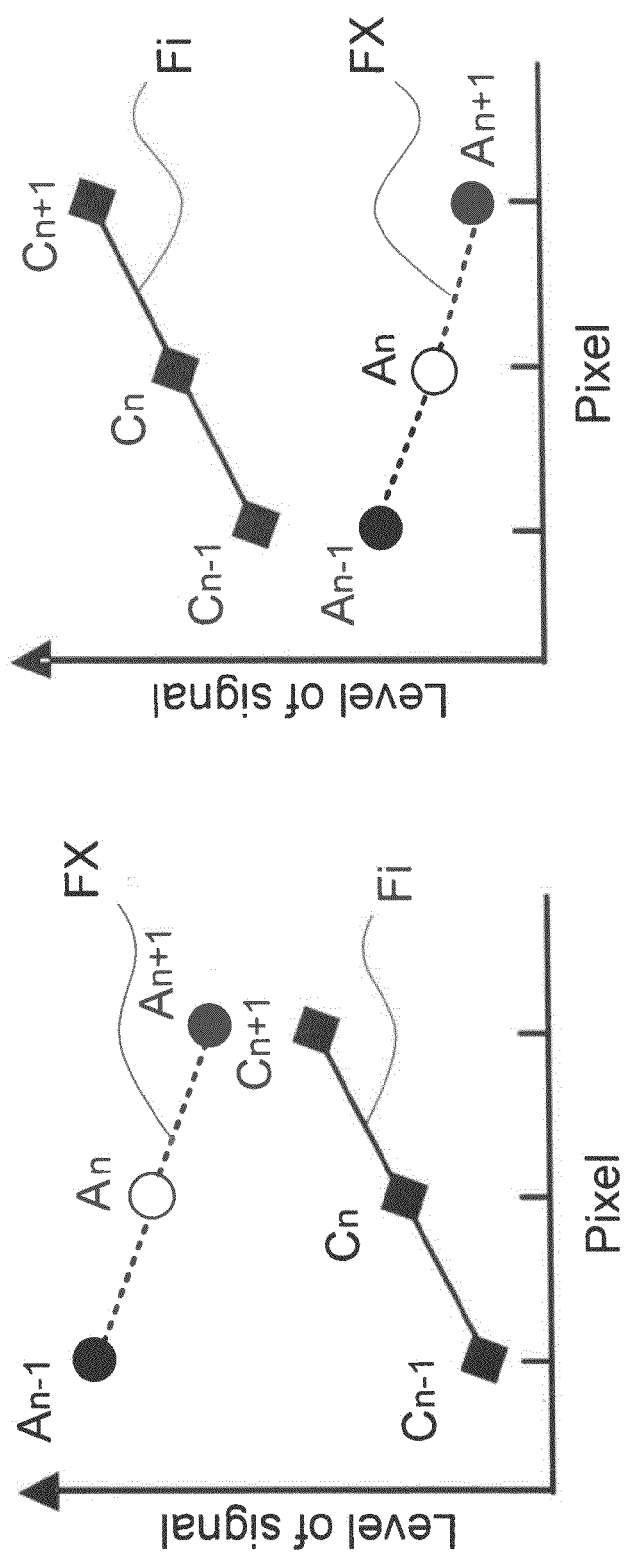
FIG. 8D is a figure showing an example case that the variation of the pixels in the comparative frame is continuous and has the sloping shape.

FIG. 8D shows an example case that the variation of the pixels ($C_{n-1}, C_n, C_{n+1}$) in the comparative frame Fi is continuous and has a sloping shape. Moreover, the signal level fills ($A_{n-1} > A_{n+1}$) and ($C_{n-1} < C_{n+1}$). In this case, an expression (4) is used for the temporal interpolation.

$$A_n = (C_n - C_{n-1}) \times (A_{n-1} - A_{n+1})/(C_{n+1} - C_{n-1}) + A_{n-1} \tag{4}$$

Figure 8E:
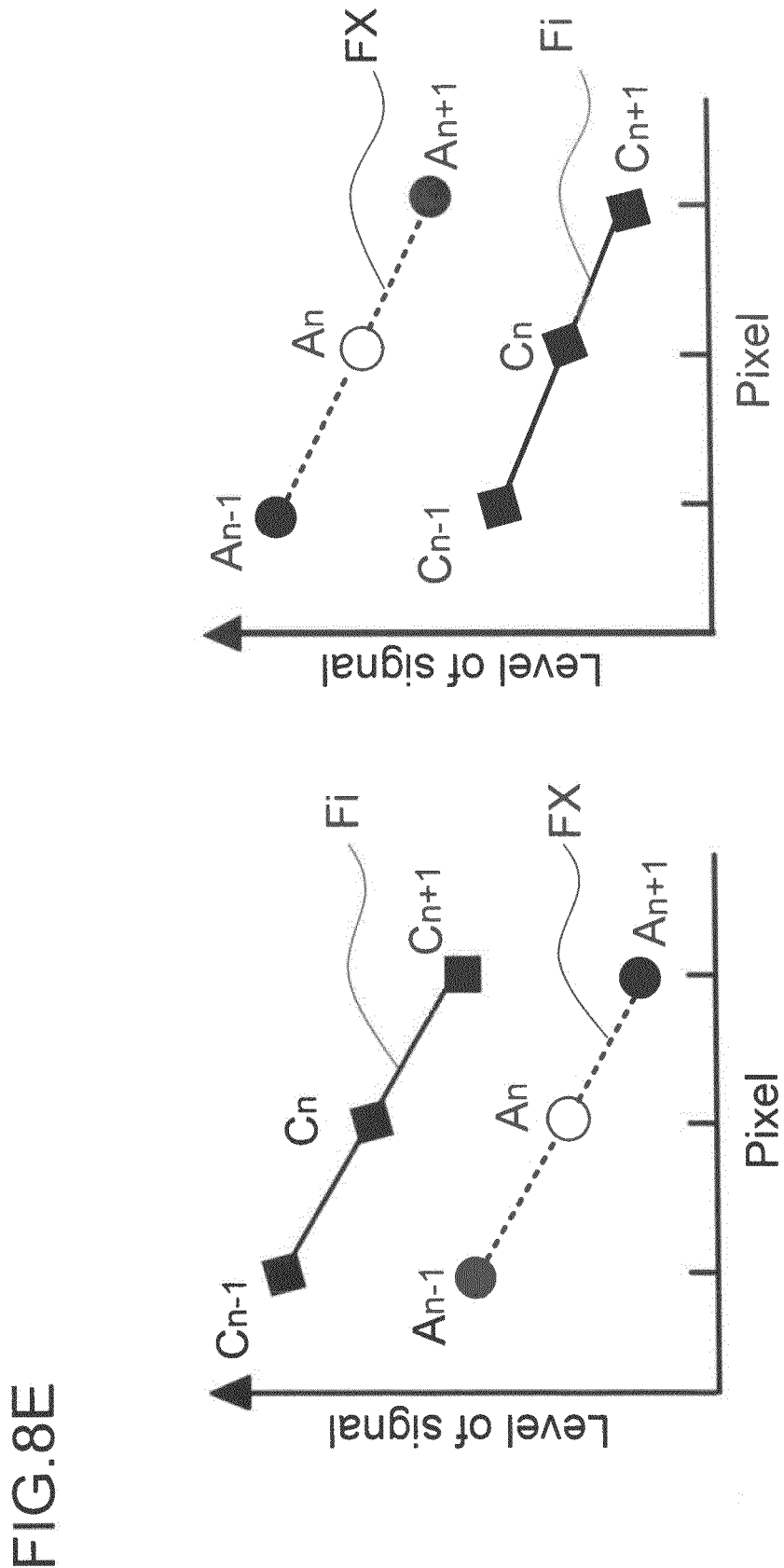
FIG. 8E is a figure showing an example case that the variation of the pixels in the comparative frame is continuous and has the sloping shape.

FIG. 8E shows an example case that the variation of the pixels ($C_{n-1}, C_n, C_{n+1}$) in the comparative frame Fi is continuous and has a sloping shape. Moreover, the signal level fills ($A_{n-1} > A_{n+1}$) and ($C_{n-1} > C_{n+1}$). In this case, an expression (5) is used for the temporal interpolation.

$$A_n = (C_n - C_{n+1}) \times (A_{n-1} - A_{n+1})/(C_{n-1} - C_{n+1}) + A_{n+1} \tag{5}$$

Figure 8F:
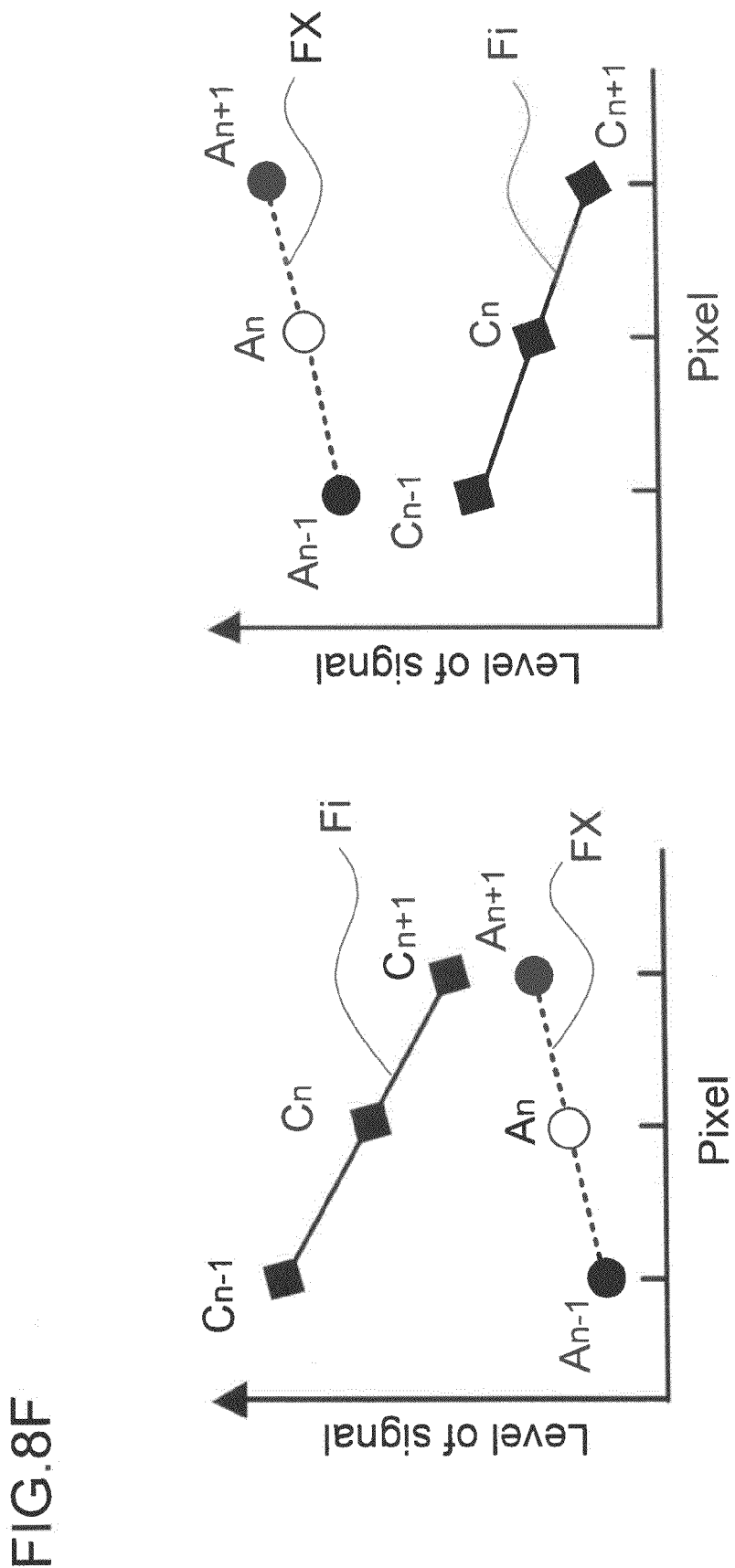
FIG. 8F is a figure showing an example case that the variation of the pixels in the comparative frame is continuous and has the sloping shape.

FIG. 8F shows an example case that the variation of the pixels ($C_{n-1}, C_n, C_{n+1}$) in the comparative frame Fi is continuous and has a sloping shape. Moreover, the signal level fills ($A_{n-1} < A_{n+1}$) and ($C_{n-1} > C_{n+1}$). In this case, an expression (6) is used for the temporal interpolation.

$$A_n = (C_n - C_{n+1}) \times (A_{n+1} - A_{n-1})/(C_{n-1} - C_{n+1}) + A_{n-1} \tag{6}$$

On the other hand, the temporal interpolation pixel may be calculated by expressions (7) and (8) regardless of the variation instead of the expressions (1) to (6). Operations for division are easily performed by the expressions (7) and (8).

In the equation (7), an average value of the pixels ($A_{n-1}, A_{n+1}$) around the missing pixel X (An) in the basic frame is calculated, and a gradient of signal is calculated from the pixels ($C_{n-1}, C_n, C_{n+1}$) in the comparative frame. Then, the missing pixel X ($A_n$) is calculated by adding the average value of the pixels ($A_{n-1}$, $A_{n+1}$) and the gradient of the pixels ($C_{n-1}$, $C_n$, $C_{n+1}$). The expression (7) is expressed as below.

$$A_n=(A_{n-1}+A_{n+1})/2+((C_n-C_{n-1})+(C_n-C_{n+1}))/2 \quad (7)$$

In the equation (8), an average value "$A_{av}$" of the pixels ($A_{n-4}$, $A_{n-3}$, $A_{n-2}$, $A_{n-1}$) except the missing pixel X ($A_n$) is calculated. Similarly, an average value "$C_{av}$" of the pixels ($C_{n-4}$, $C_{n-3}$, $C_{n-2}$, $C_{n-1}$) except the pixel $C_n$ corresponding to the missing pixel X (An) is calculated. Then, an offset ($A_{av}$–$C_{av}$) is calculated by difference between the average values $A_{av}$, $C_{av}$. The temporal interpolated pixel of the missing pixel X ($A_n$) is calculated by adding the offset to the pixel $C_n$.

The expression (8) is expressed as below.

$$A_{av}=(A_{n-4}+A_{n-3}+A_{n-2}+A_{n-1})/(px-1)$$

$$C_{av}=(C_{n-4}+C_{n-3}+C_{n-2}+C_{n-1})/(px-1)$$

$$A_n=C_n+(A_{av}-C_{av}) \quad (8)$$

In expression (8), "px" is number of the pixels in the basic frame (In the first embodiment, the px is "5"). Moreover, number of the pixels to calculate the average value $A_{av}$ or $C_{av}$ is not limited (In the expression (8), it is four pixels), but it may be at least three pixels.

<Step 2>

In the step 2, the average value $A_{av}$ of the basic frame FX and the average value $C_a$, of the comparative frame Fi are calculated in order to obtain the offset. The offset is used to adjust the signal levels of the basic frame FX and the comparative frame Fi. The average values $A_{av}$, $C_{av}$ of the FIG. 3 are calculated as below.

$$A_{av}=(A_{n-4}+A_{n-3}+A_{n-2}+A_{n-1}+A_n)px$$

$$C_{av}=(C_{n-4}C_{n-3}+C_{n-2}+C_{n-1}+C_n)/px$$

"px" is number of the pixels in the basic frame (In the first embodiment, the px is "5").

Next, differences between the pixels in the basic frame FX and the corresponding pixels in the comparative frame Fi (In FIG. 3, $A_{n-4}$ and $C_{n-4}$, $A_{n-3}$ and $C_{n-3}$, $A_{n-2}$ and $C_{n-2}$, $A_{n-1}$ and $C_{n-1}$, $A_n$ and $C_n$) are calculated, respectively. Then, these differences are summed up to obtain a sum "S".

$$S=abs(C_{n-4}(A_{n-4}+C_{av}-A_{av}))+abs(C_{n-3}-(A_{n-3}+C_{av}-A_{av}))+abs(C_{n-2}(A_{n-2}+C_{av}-A_{av}))+abs(C_{n-1}-(A_{n-1}+C_{av}-A_{av}))+abs(C_n-(A_n+C_{av}-A_{av}))$$

"abs" means absolute value.

As shown in FIG. 4, the signal levels of the basic frame FX and the comparative frame Fi are adjusted by the offset ($A_{av}$–$C_{av}$).

<Step 3>

The step 1 and step 2 are repeated for number of the comparative frames. In the example of FIG. 7, the step 1 and step 2 are repeated 12 times. As a result, the differences of the basic frame FX and the comparative frames Fi are obtained. The smallest difference may have the highest pattern matching between the basic frame FX and the comparative frames Fi. Therefore, the temporal interpolated pixel is adopted as the final interpolated pixel, when the difference is the smallest.

According to the first embodiment, accuracy of the interpolation is improved by the pattern matching. As a result, vertical stripes can be reduced in the halftone dot image and false color is improved at edge of image.

Figure 10:
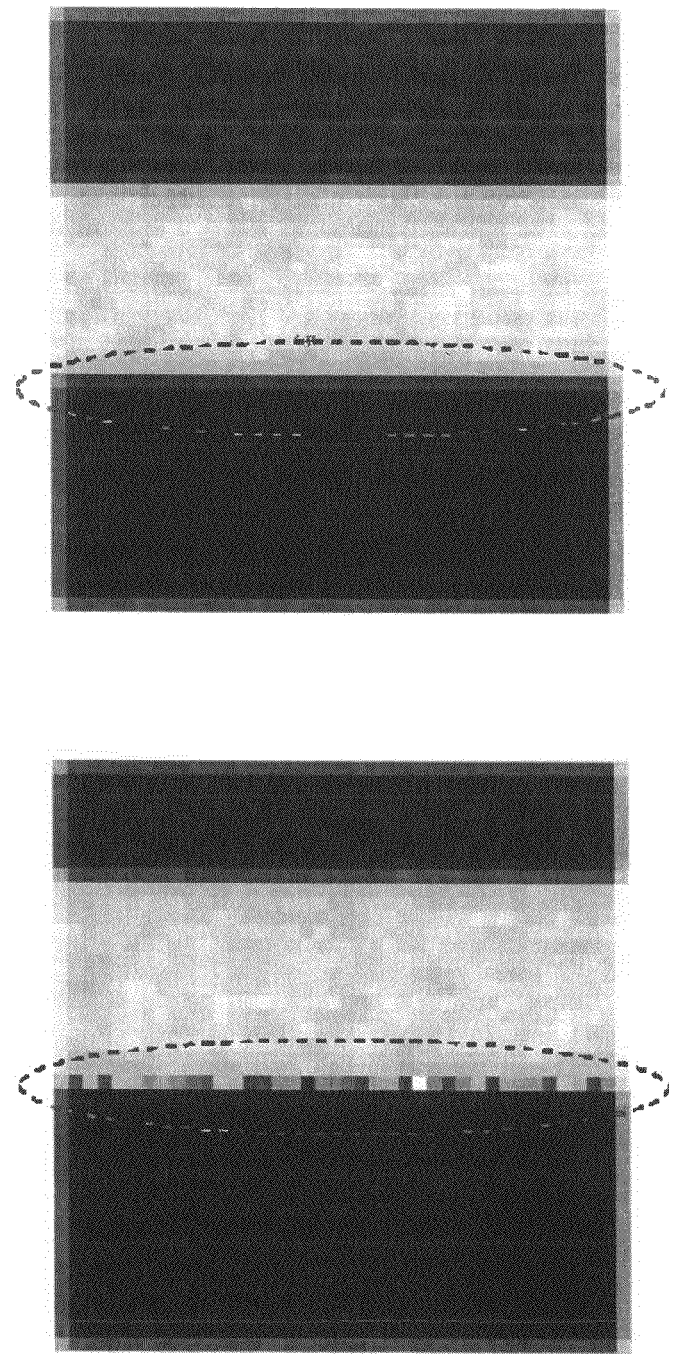
FIG. 10 is a picture using the interpolations of the first embodiment and the conventional technique.

FIGS. 9 and 10 are pictures using the interpolations of the first embodiment and the conventional technique. As shown in FIGS. 9 and 10, the interpolation of the first embodiment reduces the vertical stripes in the halftone dot image and improves the false color at edge of image.

Figure 11:
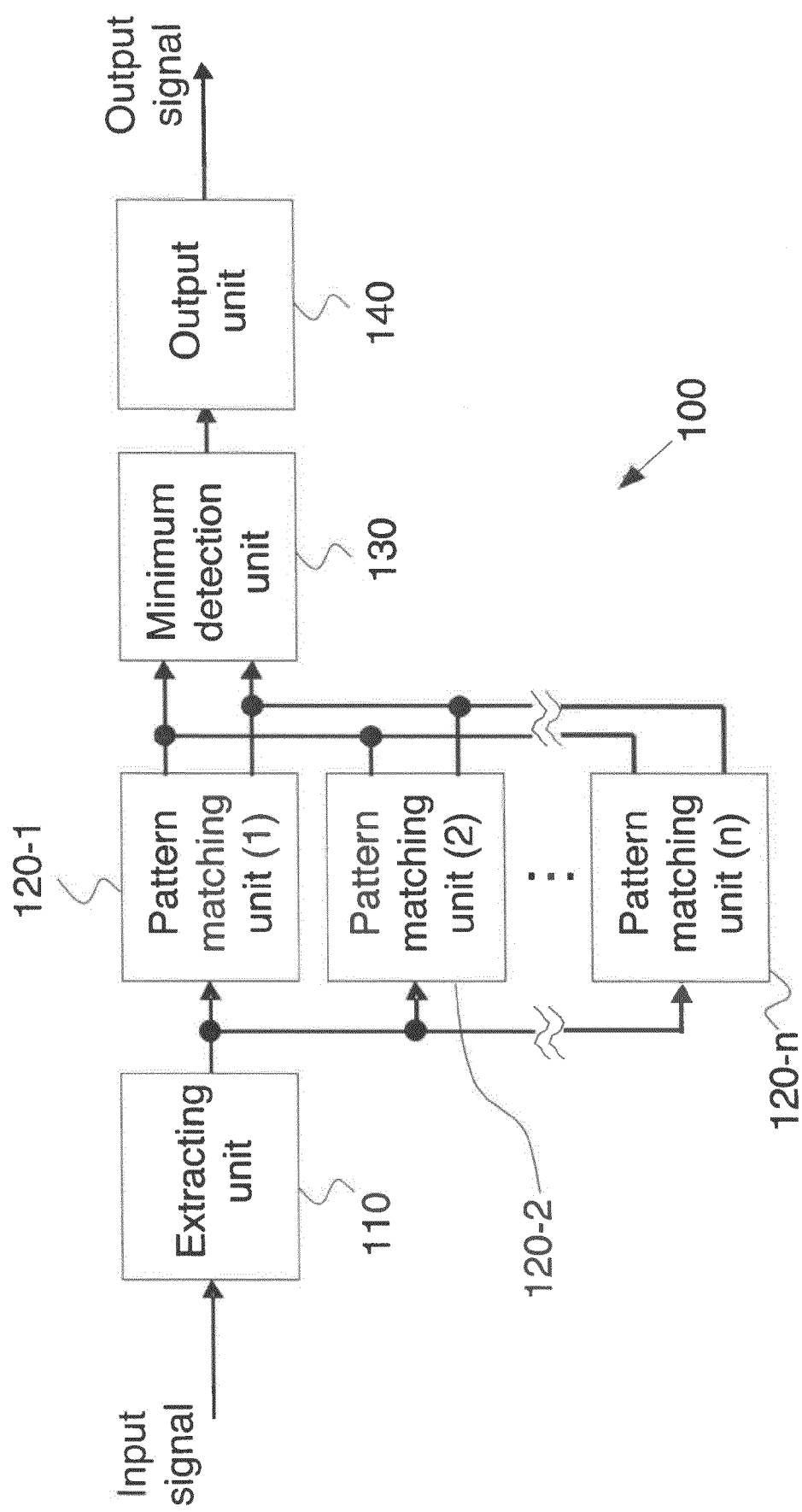
FIG. 11 is a block diagram of an image interpolation apparatus 100 according to the first embodiment.
Figure 12:
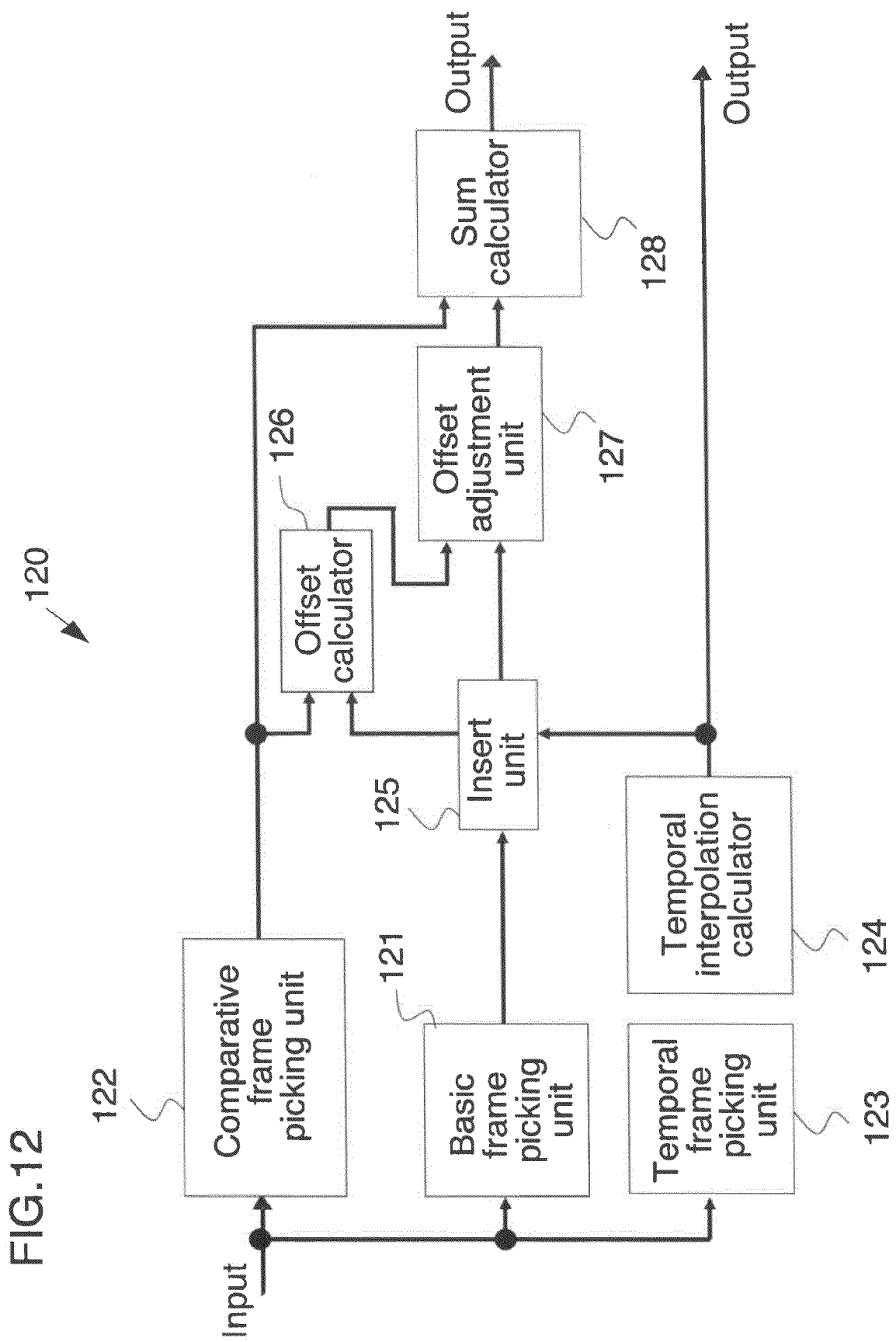
FIG. 12 is a block diagram of one of pattern matching units 120 shown in FIG. 11.

FIG. 11 is a block diagram of an image interpolation apparatus 100 according to the first embodiment. FIG. 12 is a block diagram of one of pattern matching units 120 shown in FIG. 11.

As shown in FIG. 11, the image interpolation apparatus 100 includes an extracting unit 110, the pattern matching units 120-1~120-n, a minimum detection unit 130, and an output unit 140. The extracting unit 110 extracts pixels around the missing pixel X. The pattern matching units 120-1~120-n perform the pattern matching repeating for number of the comparative frames. The minimum detection unit 130 selects a minimum difference between the basic frame and the comparative frame from the differences calculated in the pattern matching units 120-1~120-n. The output unit 140 outputs a temporal interpolated pixel having the minimum difference as a final interpolated pixel. These units may be provided by hardware or software.

The extracting unit 110 calculates positions of the pixels around the missing pixel X based on number of image scanner chips providing the contact image sensor (CIS) and number of CCDs providing the image scanner chip. Then, the extracting unit 110 reads the pixels from the calculated positions, and outputs the pixels of the basic frame FX and the comparative frames F1 to F12 to the pattern matching units 120-1~120-n.

Number of the pattern matching units 120-1~120-n is equal to number of the comparative frames in order to perform pattern matching between the basic frame FX and each of the comparative frames F1 to F12. In the first embodiment, number of the pattern matching units 120-1~120-n is "12". Detail of the pattern matching units 120-1~120-n is described later with reference to FIG. 12. The pattern matching units 120-1~120-n perform the pattern matching and calculates the differences between the basic frame and the comparative frame in the pattern matching.

The minimum detection unit 130 selects a minimum value among the differences between the basic frame and the comparative frame. The minimum detection unit 130 includes twelve comparison circuits comparing two signals to select the minimum difference. The output unit 140 outputs the temporal interpolated pixel having the minimum difference selected in the minimum detection unit 130 as the final interpolated pixel.

The pattern matching units 120-1~120-n are formed as shown in FIG. 12.

Each pattern matching unit 120-1~120-n includes an basic frame picking unit 121, a comparative frame picking unit 122, an temporal frame picking unit 123, a temporal interpolation calculator 124, an insert unit 125, an offset calculator 126, an offset adjustment unit 127, and a sum calculator 128. These units may be provided by hardware or software.

The extracting unit 110 outputs the pixels of the basic frame FX to the basic frame picking unit 121. Also, the extracting unit 110 outputs the pixels of the comparative frame Fi to the comparative frame picking unit 122. Moreover, the extracting unit 110 outputs pixels of the basic frame FX and the comparative frame Fi used for operation of the temporal interpolation to the temporal frame picking unit 123.

The temporal frame picking unit 123 outputs the pixels of the basic frame FX and the comparative frame Fi to the temporal interpolation calculator 124. The basic frame picking unit 121 outputs the pixels of the basic frame FX to the insert unit 125. Moreover, the temporal interpolation calculator 124 outputs the temporal interpolated pixels to the insert unit 125.

The comparative frame picking unit 122 outputs pixels to the offset calculator 126. The insert unit 125 also outputs pixels to the offset calculator 126. Moreover, the insert unit 125 outputs pixels to the offset adjustment unit 127. The offset calculator 126 also outputs offset to the offset adjustment unit 127. The offset adjustment unit 127 adjusts pixels in the basic frame by the offset to obtain adjusted pixels. Then, the offset adjustment unit 127 outputs the adjusted pixels to the sum calculator 128. The comparative frame picking unit 122 also outputs the pixels to the sum calculator 128.

Next, we will explain operation of the image interpolation apparatus 100 with reference to FIGS. 7, 11, 12, and 13. In this explanation, the pattern matching unit 120-1 performs the pattern matching between the basic frame FX and the comparative frame F1.

Similarly, the pattern matching unit 120-2 performs the pattern matching between the basic frame FX and the comparative frame F2, and the pattern matching unit 120-3 performs the pattern matching between the basic frame FX and the comparative frame F3. At last, the pattern matching unit 120-n performs the pattern matching between the basic frame FX and the comparative frame F12. The missing pixel X in the basic frame FX is replaced to the temporal interpolated pixel due to each pattern matching unit 120-i.

Figure 13:
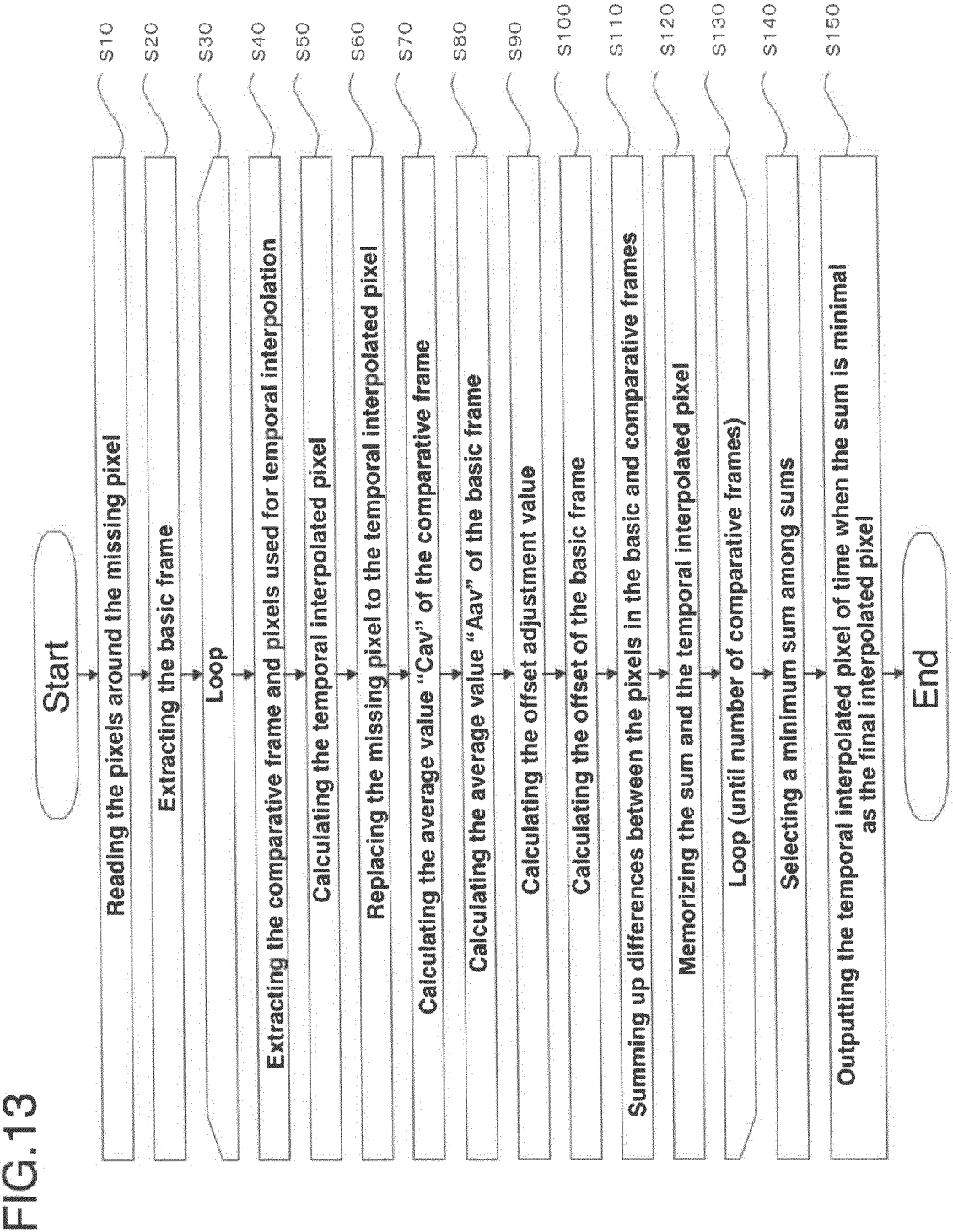
FIG. 13 is a flowchart explaining operations of the image interpolation apparatus 100.

The extracting unit 110 reads the pixels around the missing pixel based on layout of the contact image sensor (CIS) (in step S10 of FIG. 13). Then, the extracting unit 110 outputs the basic frame FX to the basic frame picking unit 121 in each of the pattern matching units 120-1 to 120-n (in step S20 of FIG. 13).

FIG. 13 is a flowchart explaining operation of the pattern matching. In FIG. 13, step S30 to step S130 are repeated for number of the comparative frames. After the extracting unit 110 inputs the comparative frame F1 to F12 into the pattern matching units 120-1 to 120-n respectively, each pattern matching unit 120-1, . . . , 120-n performs the step S70 to S110 in parallel.

Operation of the pattern matching in the pattern matching 120-1 is described below.

The comparative frame F1 (pixels 1 to 5 in FIG. 7) extracted by the extracting unit 110 is set into the comparative frame picking unit 122. Moreover, the pixels 9, 11 used for temporal interpolation in the basic frame FX and the pixels 4, 5, 6 used for temporal interpolation in the comparative frame F1 are set into the temporal frame picking unit 123 (in step S40 of FIG. 13).

If the temporal interpolation calculator 124 receives the pixels 9, 11 in the basic frame FX and the pixels 4, 5, 6 in the comparative frame F1, the temporal interpolation calculator 124 calculates the temporal interpolated pixel Fx1 by performing any one of the expressions (1) to (6), or expressions (7), or expressions (8). Then, the temporal interpolation calculator 124 outputs the temporal interpolated pixel Fx1 to the insert unit 125 and the minimum detection unit 130 (in step S50 of FIG. 13).

Similarly, the comparative frame F2 (including the pixels 2 to 6 in FIG. 7) extracted by the extracting unit 110 is set into the comparative frame picking unit 122 of the pattern matching 120-2. Moreover, the pixels 9, 11 in the basic frame FX and the pixels 5, 6, 7 in the comparative frame F2 are set into the temporal frame picking unit 123 (in step S40 of FIG. 13). If the temporal interpolation calculator 124 receives the pixels 9, 11 in the basic frame FX and the pixels 5, 6, 7 in the comparative frame F1, the temporal interpolation calculator 124 calculates the temporal interpolated pixel Fx2 by performing any one of the expressions (1) to (6), or expressions (7), or expressions (8). Then, the temporal interpolation calculator 124 outputs the temporal interpolated pixel Fx2 to the insert unit 125 and the minimum detection unit 130 (in step S50 of FIG. 13).

Similarly, the comparative frame F12 (including the pixels 15 to 19 in FIG. 7) extracted by the extracting unit 110 is set into the comparative frame picking unit 122. Moreover, the pixels 9, 11 in the basic frame FX and the pixels 18, 19, 20 in the comparative frame F12 are set into the temporal frame picking unit 123 (in step S40 of FIG. 13). If the temporal interpolation calculator 124 receives the pixels 9, 11 in the basic frame FX and the pixels 18, 19, 20 in the comparative frame F12, the temporal interpolation calculator 124 calculates the temporal interpolated pixel Fx12 by performing any one of the expressions (1) to (6), or expressions (7), or expressions (8). Then, the temporal interpolation calculator 124 outputs the temporal interpolated pixel Fx12 to the insert unit 125 and the minimum detection unit 130 (in step S50 of FIG. 13).

Other pattern matching units 120-3 to 120-11 operate as same as the matching unit 120-1, 120-2, 120-12 described above.

The insert unit 125 replaces the missing pixel X (the pixel 10) to the temporal interpolated pixel Fx1 calculated in the temporal interpolation calculator 124. Then, the insert unit 125 outputs the basic frame FX inserted the temporal interpolated pixel Fx1 to the offset calculator 126 and the offset adjustment unit 127 (in step S60 of FIG. 13).

The offset calculator 126 calculates the average value $A_{av}$ of the basic frame FX inserted the temporal interpolated pixel Fx1 (in step S70 of FIG. 13). Similarly, the offset calculator 126 calculates the average value $C_{av}$ of the comparative frame F1 (in step S80 of FIG. 13). Then, the offset calculator 126 calculates the difference of the average values $C_{av}$, $A_{av}$ to obtain the offset ($C_{av}$−Aav), and outputs the offset to the offset adjustment unit 127 (in step S90 of FIG. 13). The average values $C_{av}$, $A_{av}$ are calculated as below.

$$A_{av}=(pixel\ 6+pixel\ 7+pixel\ 8+pixel\ 9+pixel\ 10)/5.$$

$$C_{av}=(pixel\ 1+pixel\ 2+pixel\ 3+pixel\ 4+pixel\ 5)/5.$$

The missing pixel X (the pixel 10) is equal to the temporal interpolated pixel Fx1.

The offset adjustment unit 127 adds the offset ($C_{av}$−$A_{av}$) calculated in the offset calculator 126 to the basic frame FX (in step S100 of FIG. 13). Then, the sum calculator 128 sums up the differences between the pixels in the basic frame FX and the pixels in the comparative frame F1 to obtain a sum "S", and outputs the sum "S" to the minimum detection unit 130 (in step S110 of FIG. 13).

As described above, the differences between the pixels in the basic frame FX and the corresponding pixels in the comparative frame F1 (for example, in FIG. 7, pixel 6 and pixel 1, pixel 7 and pixel 2, pixel 8 and pixel 3, pixel 9 and pixel 4, pixel 10 and pixel 5) are summed up in absolute value in order to obtain the sum "S" by the offset adjustment unit 127 and the sum calculator 128.

$$S=abs(pixel\ 1-(pixel\ 6+C_{av}-A_{av}))+abs(pixel\ 2-(pixel\ 7+C_{av}-A_{av}))+abs\ (pixel\ 3-(pixel\ 8+C_{av}-A_{av}))+\\abs(pixel\ 4-(pixel\ 9+C_{av}-A_{av}))+abs\ (pixel\\5-(pixel\ 10+C_{av}-A_{av}))$$

The missing pixel X (the pixel 10) is the temporal interpolated pixel Fx1.

The sum "S" and the temporal interpolated pixel are stored in a memory (not shown) (in step S120 of FIG. 13). The steps S30~S120 are repeatedly performed for number of the comparative frames F1~F12 to calculate the sum "S" and the temporal interpolated pixel in each performing the steps S30~S120. In the first embodiment, since there are 12 comparative frames, the steps S30~S120 are performed twelve times.

The minimum detection unit 130 selects a minimum sum among sums S1, S2, S3, . . . , S12 (in step S140 of FIG. 13). Each of the sums S1, S2, . . . , S12 is a sum of the differences between the basic frame FX and the each of the comparative frames F1~F12, respectively. Then, the minimum detection unit 130 outputs a pixel with the minimum sum as a temporal interpolated pixel to the output unit 140. The output unit 140 outputs the temporal interpolated pixel of time when the sum is minimal as the final interpolated pixel (in step S150 of FIG. 13).

According to the first embodiment, accuracy of the interpolation is improved by the pattern matching. As a result, vertical stripes can be reduced in the halftone dot image and false color is improved at edge of image.

The Modified Example of the First Embodiment

The modified example of the first embodiment will be explained with reference to FIG. 11 and FIG. 15.

In FIG. 11, the temporal interpolated pixel of the time when the sum is minimal is adopted as the final interpolated pixel. Moreover, other interpolation technique may be combined.

Figure 14:
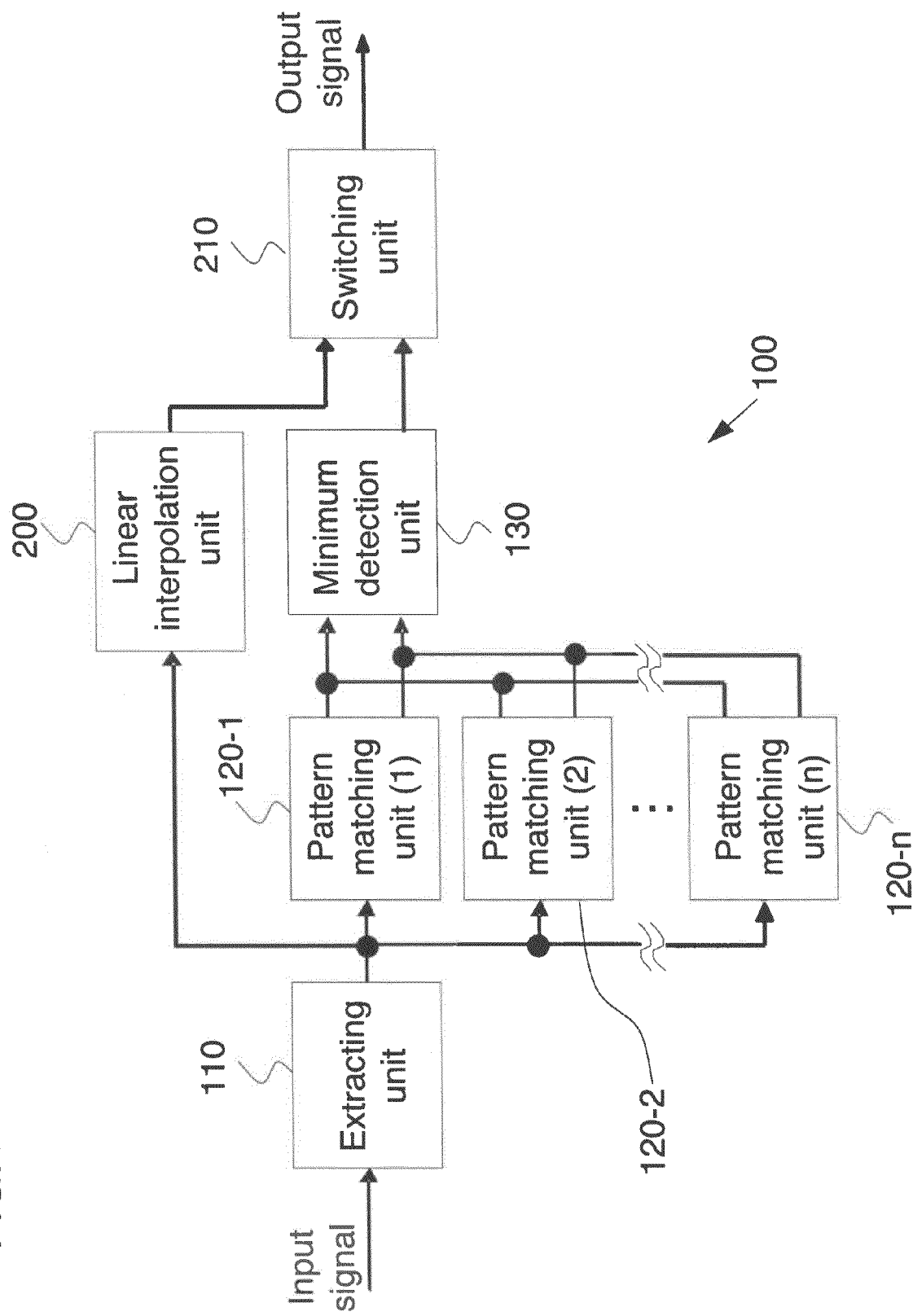
FIG. 14 is a block diagram of the image interpolation apparatus 100 according to the modified example of the first embodiment.

For example, as shown in FIG. 14, the image interpolation apparatus 100 further includes a linear interpolation unit 200 and a switching unit 210. The linear interpolation unit 200 calculates average value of the pixels which exist in both side of the missing pixel X, and outputs the average value as a linear interpolated pixel. The switching unit 210 selects either of the temporal interpolated pixel from the minimum detection unit 130 or the linear interpolated pixel from the linear interpolation unit 200, and outputs it as the final interpolated pixel.

A threshold is preliminarily set to the switching unit 210. If the minimum sum from the minimum detection unit 130 is smaller than the threshold, the switching unit 210 outputs the temporal interpolated pixel from the minimum detection unit 130 as the final interpolated pixel. On the other hand, if the minimum sum from the minimum detection unit 130 is larger than the threshold, the switching unit 210 outputs the linear interpolated pixel from the linear interpolation unit 200 as the final interpolated pixel.

When the sum is minimal and the basic frame and the comparative frame have low matching as shown in FIG. 6, accuracy of the temporal interpolated pixel may be low by the pattern matching. The modified example of the first embodiment improves the accuracy by selecting either of the temporal interpolated pixel from the minimum detection unit 130 or the linear interpolated pixel from the linear interpolation unit 200.

Figure 15:
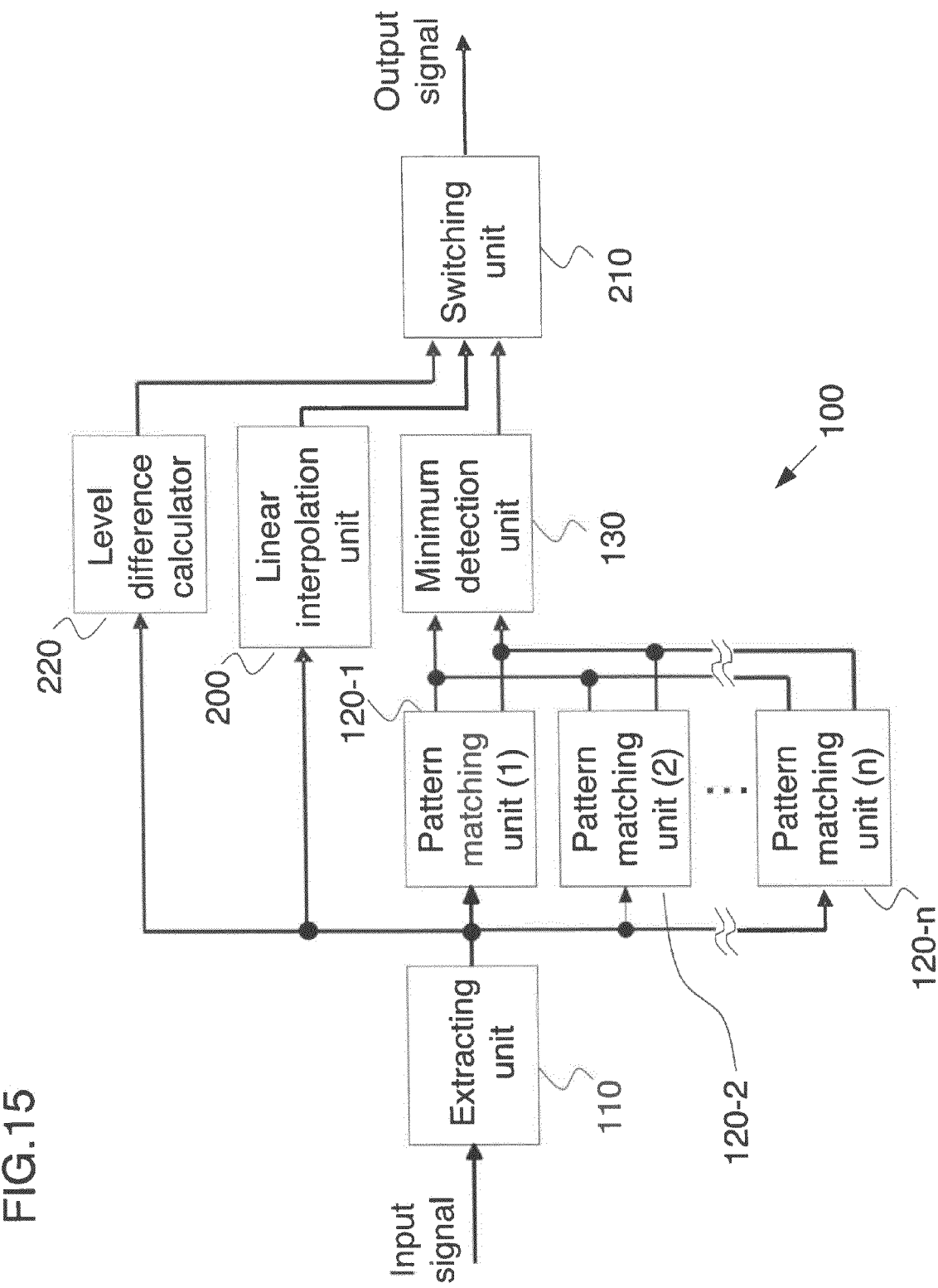
FIG. 15 is a block diagram of the image interpolation apparatus 100 according to the modified example of the first embodiment.

Next, the image interpolation apparatus 100 as shown in FIG. 15 further includes a level difference calculator 220. The level difference calculator 220 calculates difference of signal levels of the pixels which exist in both side of the missing pixel X, and outputs the difference of the signal levels to the switching unit 210. Specifically, the level difference calculator 220 calculates an average value of the pixels which exist in one side of the missing pixel and another average value of the pixels which exist in another side of the missing pixel. Then, the level difference calculator 220 calculates difference of the average values and outputs the difference.

The switching unit 210 selects either of the temporal interpolated pixel of the time when the sum is minimal or the linear interpolated pixel from the linear interpolation unit 200 based on the difference of the signal levels from the level difference calculator 220. Then, the switching unit 210 outputs it as the finale interpolated pixel.

The switching unit 210 compares the difference of the signal levels with the threshold. If the difference of the signal levels is smaller than the threshold, the switching unit 210 outputs the temporal interpolated pixel from the minimum detection unit 130 as the final interpolated pixel. On the other hand, if the difference of the signal levels is larger than the threshold, the switching unit 210 outputs the linear interpolated pixel from the linear interpolation unit 200 as the final interpolated pixel.

According to the modified example of the first embodiment, the image interpolation apparatus 100 improves the accuracy by selecting either of the temporal interpolated pixel from the minimum detection unit 130 or the linear interpolated pixel from the linear interpolation unit 200.

Description of the Second Embodiment

In the first embodiment and the modified example, the difference is calculated after the pixels of the basic pattern and the pixels of the comparative pattern are adjusted by the offset. In the second embodiment, an edge component of the basic pattern and an edge component of the comparative pattern are calculated. Then, a difference of the edge components is calculated. Other operations (for example, calculating position of the pixels in the pattern matching and performing the temporal interpolation) are same as the first embodiment.

Figure 16A:
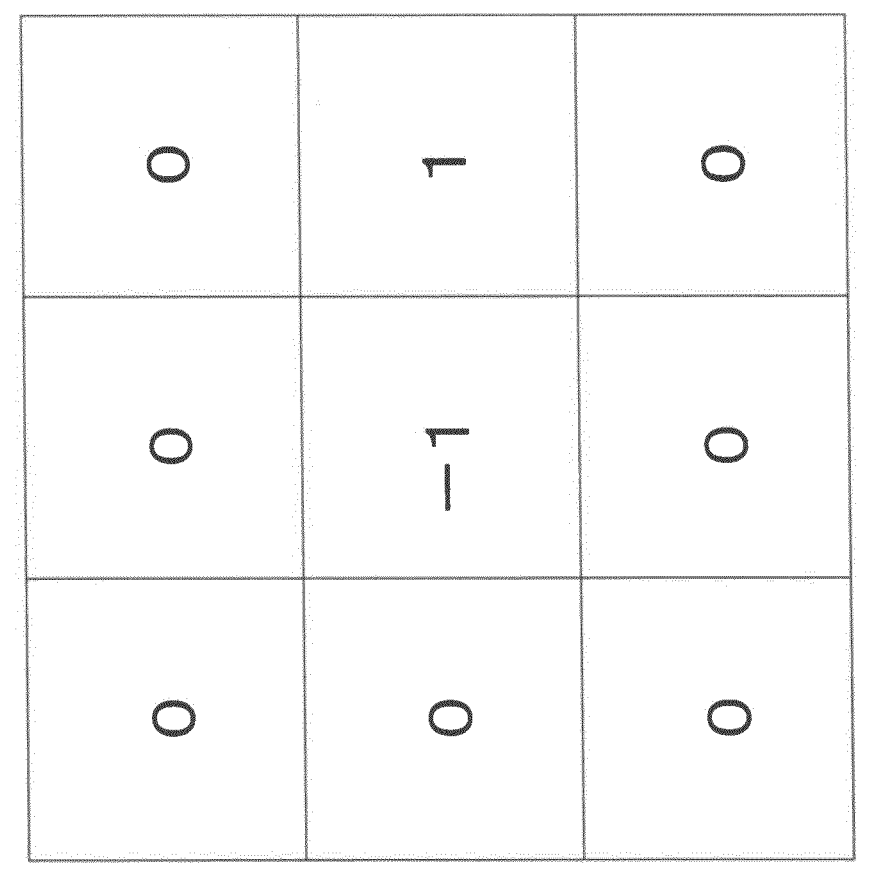
Figure 16B:
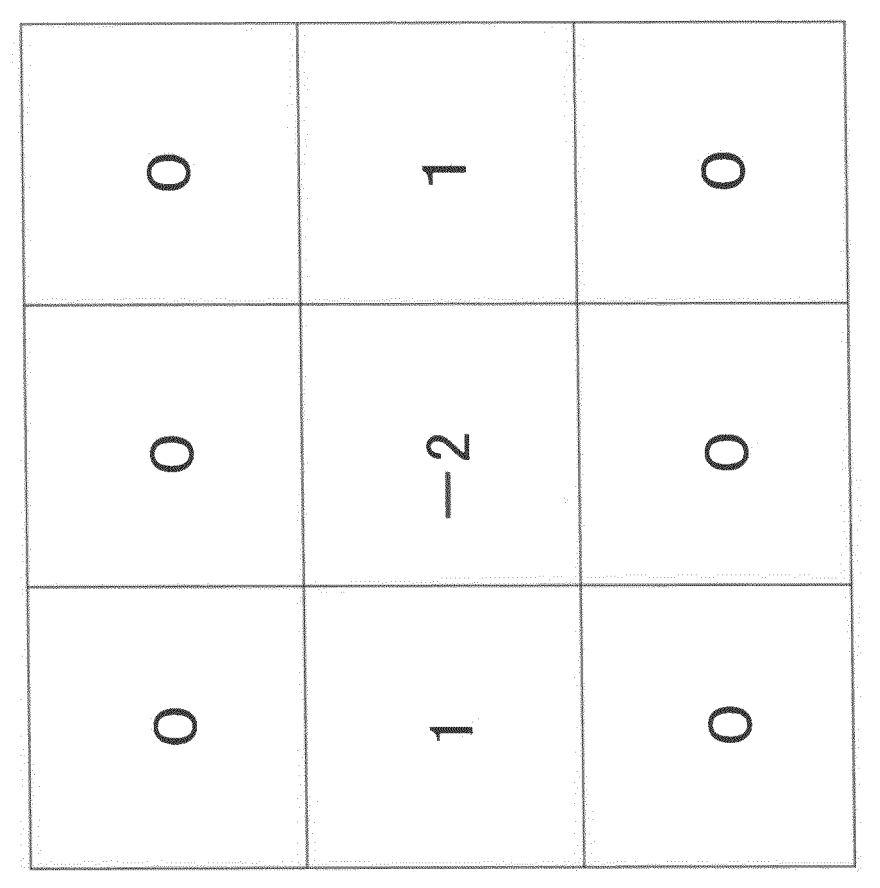
Figure 17:
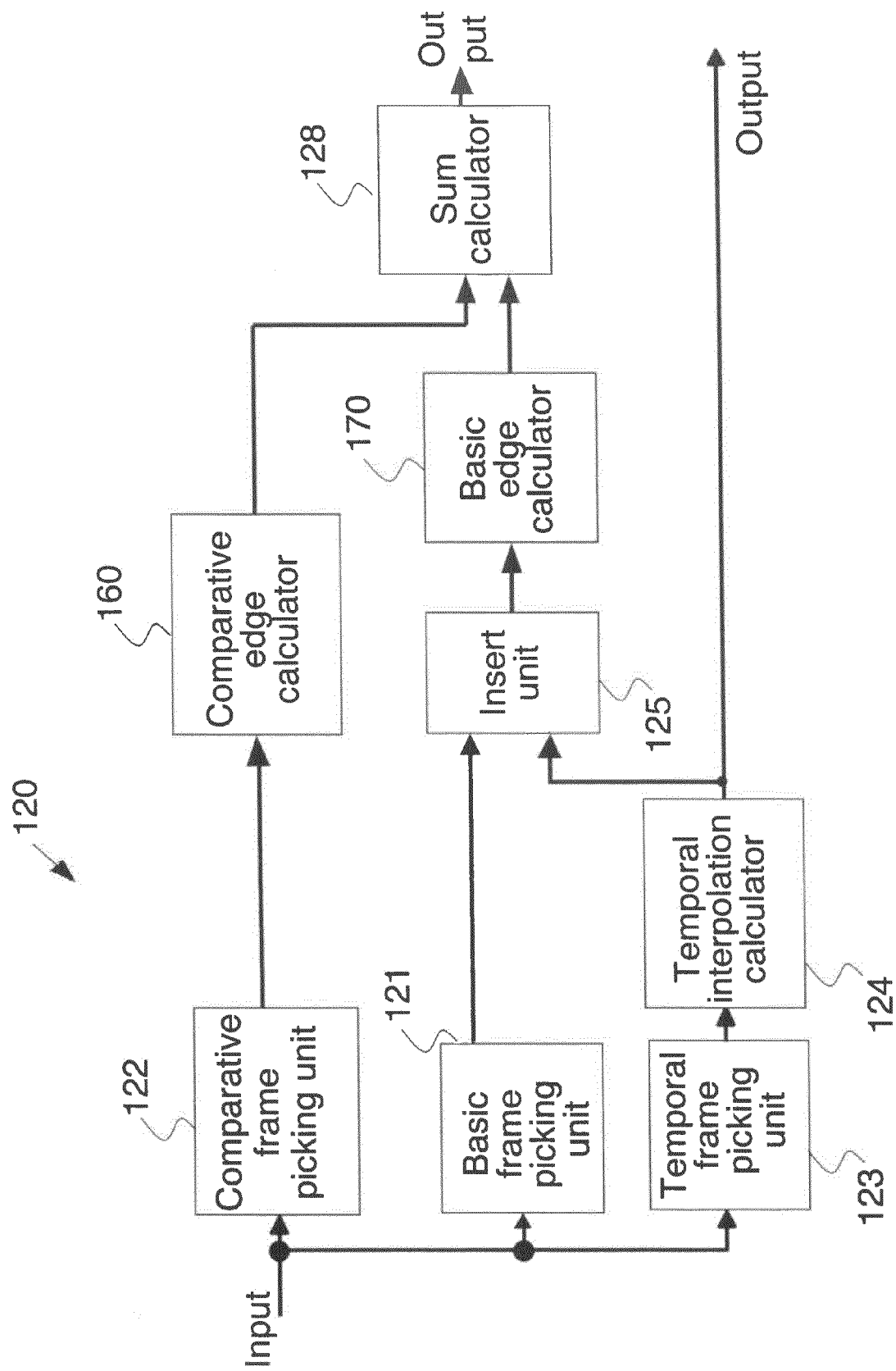
FIG. 17 is a block diagram of an image interpolation apparatus 120 according to the second embodiment.
Figure 18:
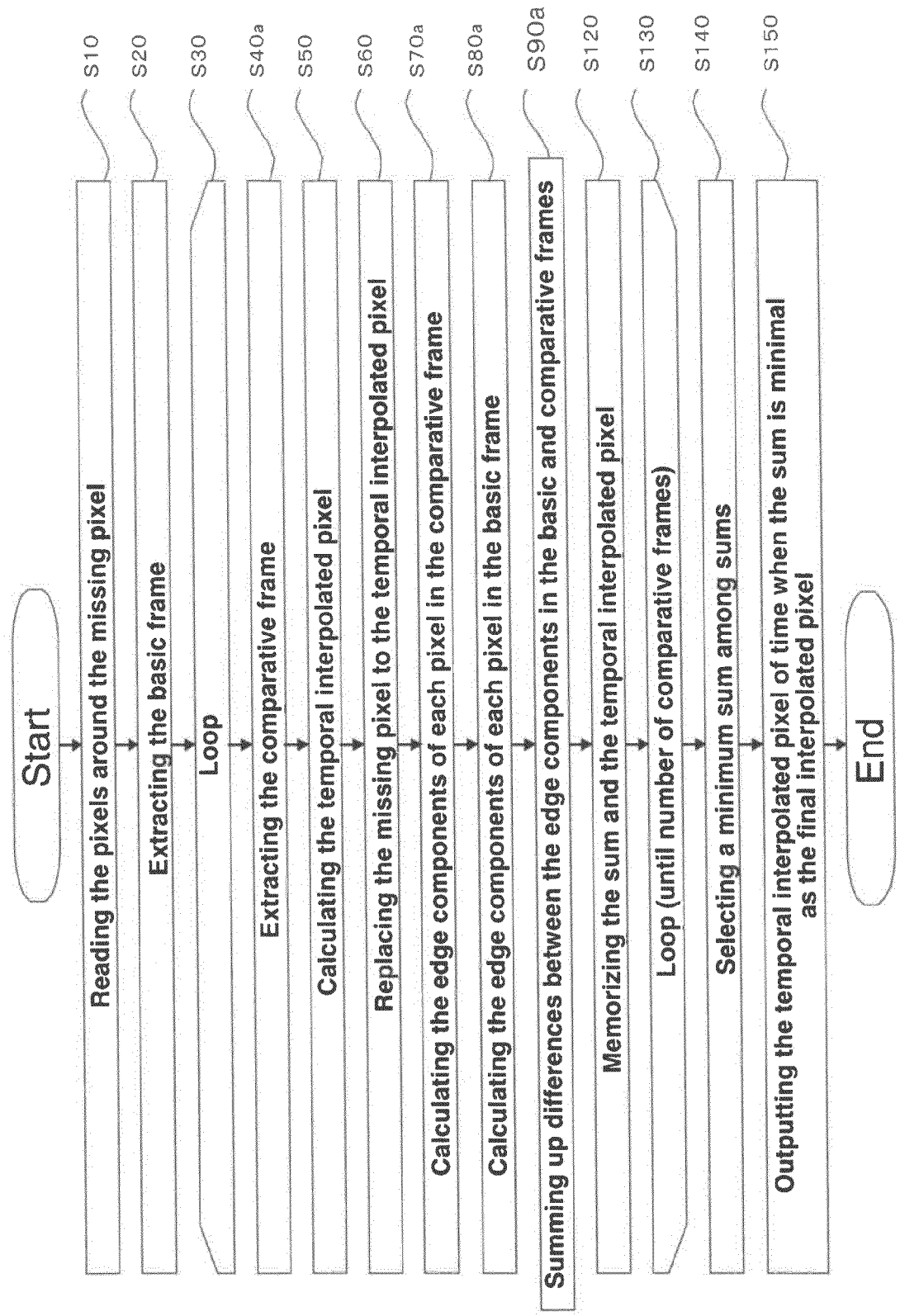
FIG. 18 is a flowchart explaining operations of the image interpolation apparatus 120.

FIGS. 16-18 are figures explaining the second embodiment. FIGS. 16A, 16B are figures explaining two derivation filters (that is a first derivation filter and a second derivation filter), respectively. FIG. 17 is a block diagram of the image interpolation apparatus 120 according to the second embodiment. FIG. 18 is a flowchart explaining operations of the image interpolation apparatus 120.

In the pattern matching of the second embodiment, the edge component of the basic pattern and the edge component of the comparative pattern are calculated in each of the pixels. And, a difference (hereinafter, referred to as "edge difference") of between the edge component of each pixel in the basic pattern and the edge component of corresponding pixel in the comparative pattern is calculated. Then, the edge differences for all pixels are summed up in absolute value to obtain a sum of edge (hereinafter, referred to as "edge sum").

The edge component is calculated based on one pixel and adjacent pixel by the first or second derivation filter. In a search range, a smallest edge sum means a highest matching of the basic pattern and the comparative pattern. Therefore, the temporal interpolated pixel achieving the smallest edge sum is outputted as the final interpolated pixel.

FIG. 16A is a figure explaining the first derivation filter. FIG. 16B is a figure explaining the second derivation filter. The edge components are calculated by the first and second derivation filters.

FIG. 17 is a block diagram of the image interpolation apparatus 120. The image interpolation apparatus 120 further includes a comparative edge calculator 160 (second edge calculator) and a basic edge calculator 170 (first edge calculator) in addition to the image interpolation apparatus 100 of the first embodiment shown in FIG. 12. The comparative edge calculator 160 calculates the edge component of the comparative frame. The basic edge calculator 170 calculates the edge component of the basic frame. The comparative edge calculator 160 exits between the comparative frame picking unit 122 and the sum calculator 128. The basic edge calculator 170 exits between the insert unit 125 and the sum calculator 128.

FIG. 18 is a flowchart explaining operations of the image interpolation apparatus 120. Operations of the step 1 (including steps S10 to S60) and the step 3 (including steps S120 to S150) are same as them of the first embodiment. Therefore, explanations of these steps are skipped.

In the step 2, the comparative edge calculator 160 calculates the edge components of each pixel in the comparative frame (in step S70a). Similarly, the basic edge calculator 170 calculates the edge components of each pixel in the basic frame (in step S80a).

The sum calculator 128 obtains the edge components from the comparative edge calculator 160 and the basic edge calculator 170. Then, the sum calculator 128 calculates the edge difference and the edge sum "S" (in step S90a).

If the first derivation filter is adopted in the comparative edge calculator 160 and the basic edge calculator 170 to calculate the edge components, the edge sum "S" is expressed as an expression below.

$$S=abs((C_{n-3}-C_{n-4})-(A_{n-3}-A_{n-4}))+abs((C_{n-2}-C_{n-3})-(A_{n-2}-A_{n-3}))+abs((C_{n-1}-C_{n-2})-(A_{n-1}-A_{n-2}))+abs((C_n-C_{n-1})-(A_n-A_{n-1}))$$

In above expression, $(C_{n-3}-C_{n-4})$, $(C_{n-2}-C_{n-3})$, $(C_{n-1}-C_{n-2})$, $(C_n-C_{n-1})$ are the edge components calculated by the comparative edge calculator 160. $(A_{n-3}-A_{n-4})$, $(A_{n-2}-A_{n-3})$, $(A_{n-1}-A_{n-2})$, $(A_n-A_{n-1})$ are the edge components calculated by the basic edge calculator 170.

If the second derivation filter is adopted in the comparative edge calculator 160 and the basic edge calculator 170 to calculate the edge components, the edge sum "S" is expressed as an expression below.

$$gC_{n-3}=(C_{n-4}-2\times C_{n-3}+C_{n-2})/2$$

$$gC_{n-2}=(C_{n-3}-2\times C_{n-2}+C_{n-1})/2$$

$$gC_{n-1}=(C_{n-2}-2\times C_{n-1}+C_n)/2$$

$$gA_{n-3}=(A_{n-4}-2\times A_{n-3}+A_{n-2})/2$$

$$gA_{n-3}=(A_{n-3}-2\times A_{n-2}+A_{n-1})/2$$

$$gA_{n-3}=(A_{n-2}-2\times A_{n-1}+A_n)/2$$

$$S=abs(gC_{n-3}-gA_{n-3})+abs(gC_{n-2}-gA_{n-2})+abs(gC_{n-1}-gA_{n-1})$$

In above expressions, $gC_{n-3}$, $gC_{n-2}$, $gC_{n-4}$ are the edge components calculated by the comparative edge calculator 160. $gA_{n-3}$, $gA_{n-2}$, $gA_{n-1}$ are the edge components calculated by the basic edge calculator 170.

The edge sum "S" calculated in the step S90a and the temporal interpolated pixel calculated in the step S50 are stored in the memory (in step S120).

According to the second embodiment, the image interpolation apparatus 120 improves accuracy of the interpolation. Also, the accuracy of the pattern matching is improved by replacing the missing pixel X in the basic pattern with the temporal interpolated pixel which is calculated from the signal levels and variation of the signal levels based on the pixels around the missing pixel X in the basic pattern and the comparative pattern. Moreover, the accuracy of the interpolation is more improved by adopting the difference between the basic pattern and the comparative pattern.

Description of the Third Embodiment

In the first and second embodiments, the interpolation for the missing pixel of 1 bit is described. In the third embodiment, an interpolation for the missing pixels of several bits will be described. The first embodiment can be applied to the interpolation for the missing pixels of several bits. However, number of the repetitions of calculating in the interpolation and the expression of the linear interpolation are different depending on the number of the missing pixels. Hereinafter, the different operations are mainly descried.

Figure 19:
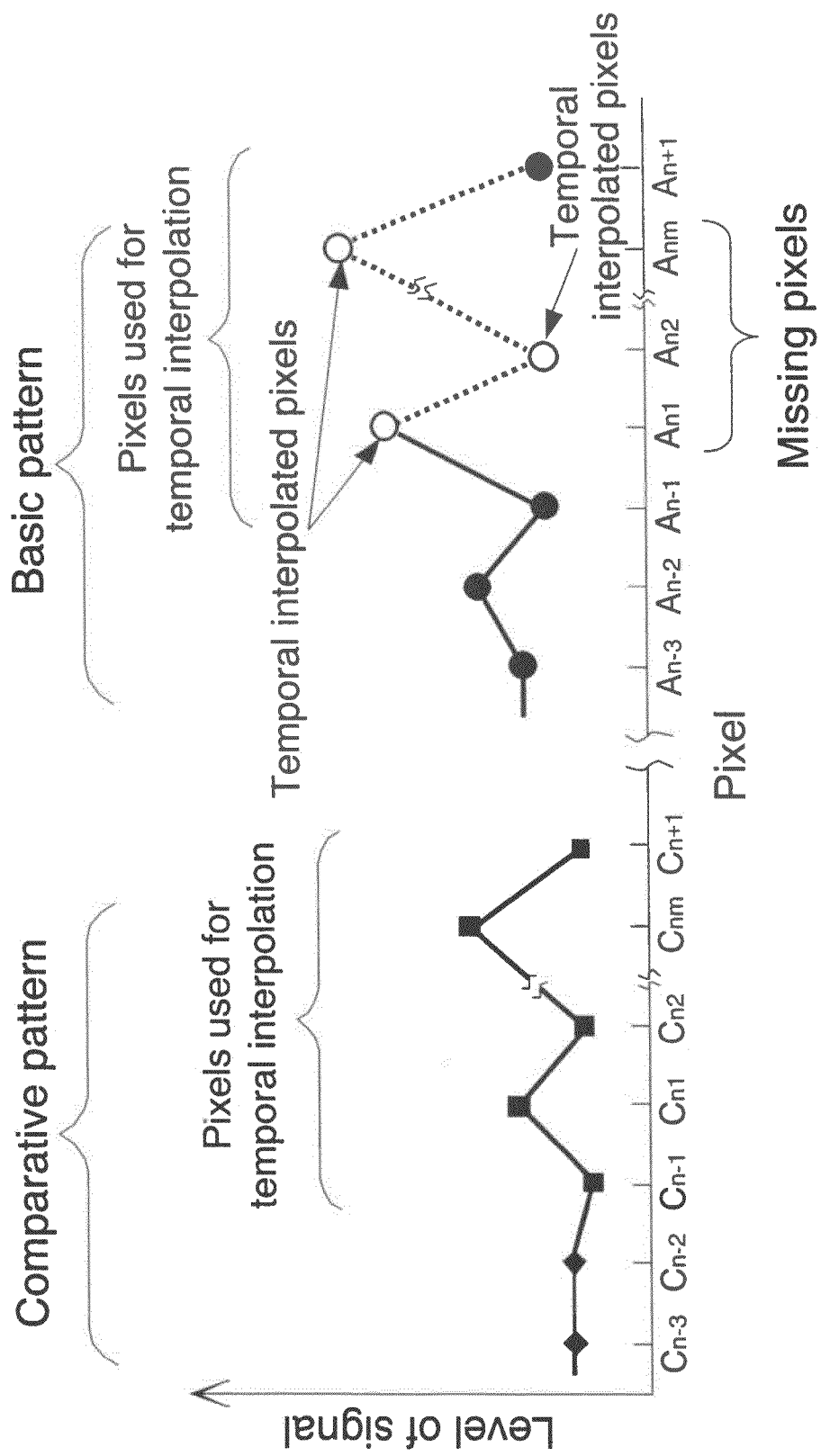
FIG. 19 is a figure explaining operation of the interpolation according to the third embodiment.

The temporal frame picking unit 123 extracts the pixels used for the interpolation. As shown in FIG. 19, if the pixels $A_{n1}, A_{n2}, \ldots, A_{nm}$ ("m" is number of the missing pixels) are missed, the pixels An−1, An+1 in the basic frame and the pixels $C_{n1}, C_{n2}, \ldots, C_{nm}, C_{n-1}, C_{n+1}$ in the comparative frame are extracted. The pixels $A_{n-1}, A_{n+1}$ are adjacent to the $A_{n1}$, $A_{nm}$ in the basic frame. The pixels $C_{n1}, C_{n2}, \ldots, C_{nm}, C_{n-1}, C_{n+1}$ in the comparative frame are corresponding to the pixels $A_{n1}, A_{n2}, \ldots, A_{nm}, A_{n-1}, A_{n+1}$ of the basic frame.

In an example of FIG. 19, one of the missing pixels $A_{n1}$ is interpolated using the pixels $C_{n-1}, C_{n1}, C_{n+1}, A_{n-1}, A_{n+1}$. Similarly, one of the missing pixels $A_{n2}$ is interpolated using the pixels $C_{n-1}, C_{n2}, C_{n+1}, A_{n-1}, A_{n+1}$. Moreover, one of the missing pixels $A_{nm}$ is interpolated using the pixels $C_{n-1}, C_{nm}, C_{n+1}, A_{n-1}, A_{n+1}$.

After extracting the pixels for the interpolation, the temporal interpolation calculator 124 calculates the temporal interpolated pixels for the missing pixels $A_{n1}, A_{n2}, \ldots, A_{nm}$. According to the missing pixels, one of the expressions (1) to (7) is performed in order to interpolate the missing pixels.

The expressions (1) to (6) are modified as described below to apply the interpolation for the several missing pixels. The missing pixel $A_n$ in the first embodiment is replaced to the missing pixels $A_{n1}, A_{n2}, A_{nm}$. Similarly, the missing pixel $C_n$ in the first embodiment is replaced to the missing pixels $C_{n1}$, $C_{n2}, C_{nm}$.

Accordingly, the expression (1) expressing FIG. 8A is modified as the expression (9).

$$A_{n1}=C_{n1}\times(A_{n-1}+A_{n+1})/(C_{n-1}+C_{n+1})$$

$$A_{n2}=C_{n2}\times(A_{n-1}+A_{n+1})/(C_{n-1}+C_{n+1})$$

$$A_{nm}=C_{nm}\times(A_{n-1}+A_{n+1})/(C_{n-1}+C_{n+1}) \quad (9)$$

The expression (2) expressing FIG. 8B is modified as the expression (10).

$$A_{n1}=(C_{n1}+(A_{n-1}+A_{n+1})/2)\times(A_{n-1}+A_{n+1})/(C_{n-1}+C_{n+1}+A_{n-1}+A_{n+1})$$

$$A_{n2}=(C_{n2}+(A_{n-1}+A_{n+1})/2)\times(A_{n-1}+A_{n+1})/(C_{n-1}+C_{n+1}+A_{n-1}+A_{n+1})$$

$$A_{nm}=(C_{nm}+(A_{n-1}+A_{n+1})/2)\times(A_{n-1}+A_{n+1})/(C_{n-1}+C_{n+1}+A_{n-1}+A_{n+1}) \quad (10)$$

The expression (3) expressing FIG. 8C is modified as the expression (11).

$$A_{n1}=(C_{n1}-C_{n-1})\times(A_{n+1}-A_{n-1})/(C_{n+1}-C_{n-1})+A_{n-1}$$

$$A_{n2}=(Cn2-C_{n-1})\times(A_{n+1}-A_{n-1})/(C_{n+1}-C_{n-1})+A_{n-1}$$

$$A_{nm}=(C_{nm}-C_{n-1})\times(A_{n+1}-A_{n-1})/(C_{n+1}-C_{n-1})+A_{n-1} \quad (11)$$

The expression (4) expressing FIG. 8D is modified as the expression (12).

$$A_{n1}=(C_{n1}-C_{n-1})\times(A_{n-1}-A_{n+1})/(C_{n+1}-C_{n-1})+A_{n+1}$$

$$A_{n2}=(C_{n2}-C_{n-1})\times(A_{n-1}-A_{n+1})/(C_{n+1}-C_{n-1})+A_{n+1}$$

$$A_{nm}=(C_{nm}-C_{n-1})\times(A_{n-1}-A_{n+1})/(C_{n+1}-C_{n-1})+A_{n+1} \quad (12)$$

The expression (5) expressing FIG. 8E is modified as the expression (13).

$$A_{n1}=(C_{n1}-C_{n+1})\times(A_{n-1}-A_{n+1})/(C_{n-1}-C_{n+1})+A_{n+1}$$

$$A_{n2}=(C_{n2}-C_{n+1})\times(A_{n-1}-A_{n+1})/(C_{n-1}-C_{n+1})+A_{n+1}$$

$$A_{nm}=(C_{nm}-C_{n+1})\times(A_{n-1}-A_{n+1})/(C_{n-1}-C_{n+1})+A_{n+1} \quad (13)$$

The expression (6) expressing FIG. 8F is modified as the expression (14).

$$A_{n1}=(C_{n1}-C_{n+1})\times(A_{n+1}-A_{n-1})/(C_{n-1}-C_{n+1})+A_{n-1}$$

$$A_{n2}=(C_{n2}-C_{n+1})\times(A_{n+1}-A_{n-1})/(C_{n-1}-C_{n+1})+A_{n-1}$$

$$A_{nm}=(C_{nm}-C_{n+1})\times(A_{n+1}-A_{n-1})/(C_{n-1}-C_{n+1})+A_{n-1} \quad (14)$$

The temporal interpolation calculator 124 may calculate the temporal interpolated pixels of the several missing pixels ($A_{n1}, A_{n2}, \ldots, A_{nm}$) ("m" is number of the missing pixels) by the expression (15) instead of the expressions (9) to (14).

$$A_{n1}=(A_{n-1}+A_{n+1})/2+((C_{n1}-C_{n-1})+(C_{n1}-C_{n+1}))/2$$

$$A_{nm}=(A_{n-1}+A_{n+1})/2+((C_{nm}-C_{n-1})+(C_{nm}-C_{n+1}))/2 \quad (15)$$

In the expression (15), the pixels $C_{n1}, C_{nm}$ in the comparative frame are corresponding to the missing pixels $A_{n1}, A_{nm}$ of the basic frame.

Figure 20:
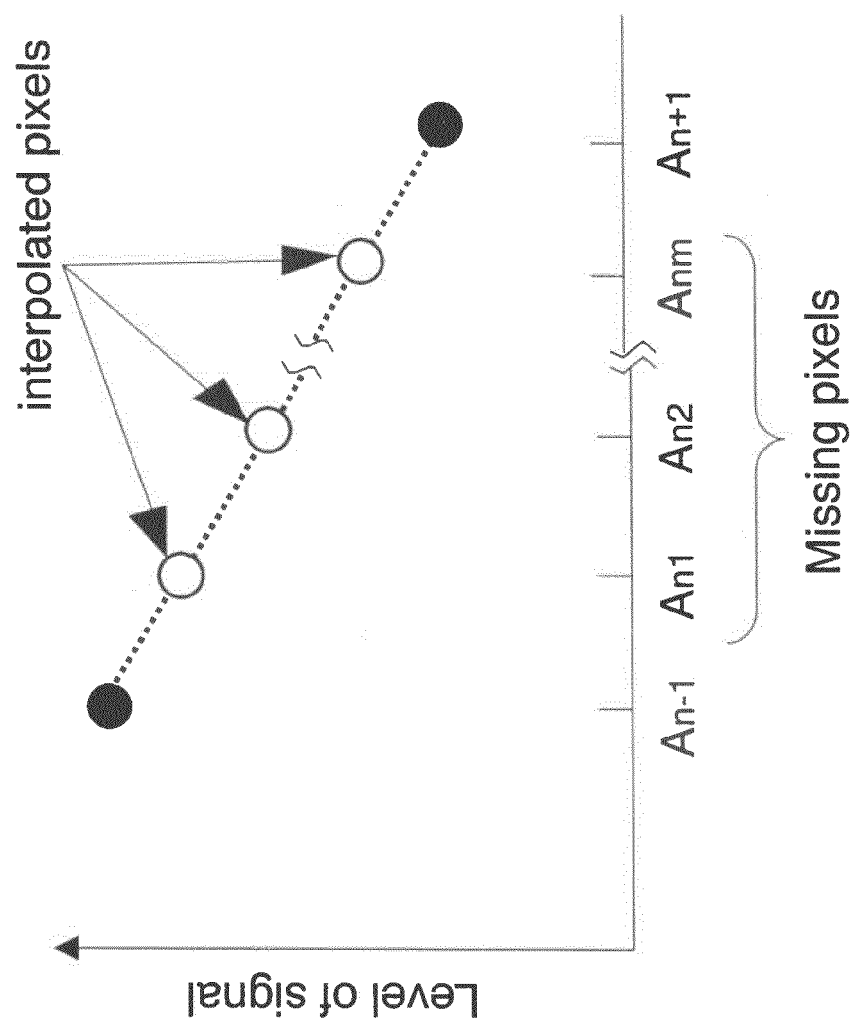
FIG. 20 is a figure explaining operation of the linear interpolation.
Figure 21:
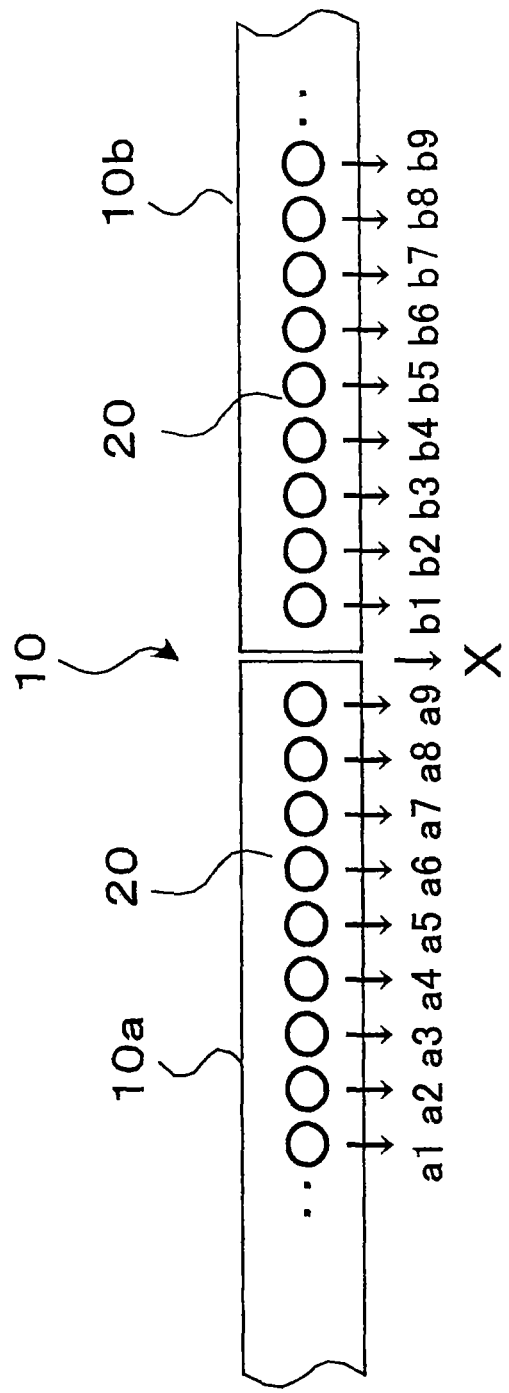
FIG. 21 is a figure illustrating an image scan sensor.

The linear interpolation unit 200 shown in FIGS. 14, 15 may perform the interpolation according to a gradient of signal shown in FIG. 20. Specifically, the linear interpolation unit 200 outputs the final interpolated pixels interpolated linearly by the following expressions using the temporal interpolated pixels $A_{n1}, A_{n2}, A_{nm}$ and the adjacent pixels $A_{n-1}, A_{n+1}$. The following expressions can be used to interpolate the missing pixel of 1 bit.

$$A_{n1}=G\times 1+A_{n-1}$$

$$A_{n2}=G\times 2+A_{n-1}$$

$$A_{nm}=G\times m+A_{n-1}$$

In above expressions, "m" is number of the missing pixels. "G" is the gradient of the signal and expressed as $G=(A_{n+1}-A_{n-1})/(m+1)$, where m=2.

Next, an example case, which two missing pixels An1, An2 exist, is described. In the example, number of the pixels included in each of the basic frame and the comparative frame is "5".

<Step 1>

The missing pixels $A_{n1}, A_{n2}$) are positioned at head or tail of the basic frame. Next, the signal levels and variation of the signal levels are calculated based on the adjacent pixels ($A_{n-1}, A_{n+1}$) of the missing pixel $A_{n1}$ in the basic frame and the pixels ($C_{n-1}, C_{n1}, C_{n+1}$) corresponding to the pixels ($A_{n-1}, A_{n1}, A_{n+1}$) in the comparative frame. Then, the temporal interpolated pixel $A_{n1}$ is calculated based on the signal levels and variation of the signal levels. The temporal interpolated pixel $A_{n1}$ is inserted to the missing pixel $A_{n1}$ in the basic frame.

Similarly, the signal levels and variation of the signal levels are calculated based on the pixels ($A_{n-1}, A_{n+1}$) around the missing pixel $A_{n2}$ in the basic frame and the pixels ($C_{n-1}, C_{n2}, C_{n+1}$) corresponding to the pixels ($A_{n-1}, A_{n2}, A_{n+1}$) in the comparative frame. Then, the temporal interpolated pixel $A_{n2}$ is calculated based on the signal levels and variation of the signal levels. The temporal interpolated pixel $A_{n2}$ is inserted to the missing pixel $A_{n2}$ in the basic frame. One of the expressions (9) to (14) is selected according to the signal levels and variation of the signal levels to calculate the temporal interpolated pixels $A_{n1}, A_{n2}$.

<Step 2>

Next, the average value $A_{av}$ of the basic frame and the average value $C_{av}$ of the comparative frame are calculated.

$$C_{av}=(C_{n-3}+C_{n-2}+C_{n-1}+C_{n1}+C_{n2})/px$$

$$A_{av}=(A_{n-3}+A_{n-2}+A_{n-1}+A_{n1}+A_{n2})px$$

In the above expressions, "px" is number of the pixels in the basic frame (In the third embodiment, "px" is "5").

Next, differences of the pixels in the basic frame and the corresponding pixels in the comparative frame (In FIG. 20, $A_{n-3}$ and $C_{n-3}$, $A_{n-2}$ and $C_{n-2}$, $A_{n-1}$ and $C_{n-1}$, $A_{n1}$ and $C_{n1}$, $A_{n2}$ and $C_{n2}$) are calculated, respectively. Then, these differences are summed up in absolute value to obtain a sum "S".

$$S=\text{abs}(C_{n-3}-(A_{n-3}+C_{av}-A_{av}))+\text{abs}(C_{n-2}-(A_{n-2}+C_{av}-A_{av}))+\text{abs}(C_{n-1}-(A_{n-1}+C_{av}-A_{av}))+\text{abs}(C_{n1}-(A_{n1}+C_{av}-A_{av}))+\text{abs}(C_{n2}-(A_{n2}+C_{av}-A_{av}))$$

<Step 3>

The step 1 and the step 2 are repeated for number of the comparative frames. The smallest difference may have the highest pattern matching between the basic frame and the comparative frames. Therefore, the temporal interpolated pixel of the time when the difference is the smallest is adopted as the final interpolated pixel.

According to the third embodiment, accuracy of the interpolation is improved by using the pixel with the highest matching in the pattern matching. As a result, vertical stripes can be reduced in the halftone dot image and false color is improved at edge of image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image interpolation apparatus formed by connecting contact image sensors to interpolate a missing pixel, each of the contact image sensors being formed by arranging scan elements in a line, the missing pixel existing between the contact image sensors, comprising:

an extracting unit for extracting pixels around the missing pixels in order to form a basic frame and comparative frames, the basic frame being formed by at least three pixels including the missing pixel, the missing pixel being located at a head or tail of the pixels in the basic frame, each of the comparative frames including the same number of the pixels as the basic frame, wherein at least one pixel of the pixels in one comparative frame does not overlap the pixels in the other comparative frames;

temporal interpolation calculators, each temporal interpolation calculator corresponding to each of the comparative frames, and calculating a temporal interpolated pixel for each of the comparative frames based on signal levels and a variation of the signal levels in terms of a first pixel group and a second pixel group, the first pixel group including adjacent pixels of the missing pixel in the basic frame, the second pixel group including an edge pixel corresponding to the missing pixel and adjacent pixels of the edge pixel in the comparative frame;

pattern matching units, each pattern matching unit corresponding to each of the comparative frames, inserting the temporal interpolated pixel of each comparative frame to the missing pixel, calculating difference between each of the pixels in the basic frame and each of the corresponding pixels in the comparative frame, and summing up the differences for all pixels in absolute value to obtain sums for all comparative frames respectively; and an output unit outputting the temporal interpolated pixel having a minimum sum among the sums as a final interpolated pixel.

2. The image interpolation apparatus of claim 1, wherein the temporal interpolation calculator calculates the temporal interpolated pixel "$A_n$"

using an expression (1) if a variation of the second pixel group ($C_{n-1}$, $C_n$, $C_{n+1}$) is not continuous and has a concavo-convex shape, and a signal level of the second pixel group ($C_{n-1}$, $C_n$, $C_{n+1}$) is larger than the signal level of the first pixel group ($A_{n-1}$, $A_{n+1}$), and using an expression (2) if a variation of the second pixel group ($C_{n-1}$, $C_n$, $C_{n+1}$) is not continuous and has a concavo-convex shape, and a signal level of the second pixel group ($C_{n-1}$, $C_n$, $C_{n+1}$) is smaller than the signal level of the first pixel group ($A_{n-1}$, $A_{n+1}$), $$A_n = C_n \times (A_{n-1} + A_{n+1}) / (C_{n-1} + C_{n+1}) \quad (1)$$

$$A_n = (C_n + (A_{n-1} + A_{n+1})/2) \times (A_{n-1} + A_{n+1}) / (C_{n-1} + C_{n+1} + A_{n-1} + A_{n+1}) \quad (2).$$

3. The image interpolation apparatus of claim 2, wherein the temporal interpolation calculator calculates several temporal interpolated pixels ($A_{n1}, \ldots, A_{nm}$) ("m" is number of the missing pixels) for the several missing pixels using an expression (9) instead of the expression (1), and using an expression (10) instead of the expression (2), $$A_{n1} = C_{n1} \times (A_{n-1} + A_{n+1}) / (C_{n-1} + C_{n+1})$$

$$A_{nm} = C_{nm} \times (A_{n-1} + A_{n+1}) / (C_{n-1} + C_{n+1}) \quad (9)$$

$$A_{n1} = (C_{n1} + (A_{n-1} + A_{n+1})/2) \times (A_{n-1} + A_{n+1}) / (C_{n-1} + C_{n+1} + A_{n-1} + A_{n+1})$$

$$A_{nm} = (C_{nm} + (A_{n-1} + A_{n+1})/2) \times (A_{n-1} + A_{n+1}) / (C_{n-1} + C_{n+1} + A_{n-1} + A_{n+1}) \quad (10)$$

where, the pixels "$C_{n1}$", "$C_{nm}$" in the comparative frame are corresponding to the missing pixels "$A_{n1}$", "$A_{nm}$" of the basic frame.

4. The image interpolation apparatus of claim 1, wherein the temporal interpolation calculator calculates the temporal interpolated pixel "$A_n$"

using an expression (3) if a variation of the second pixel group ($C_{n-1}$, $C_n$, $C_{n+1}$) is continuous and has a sloping shape, and the first pixel group ($A_{n-1}$, $A_{n+1}$) and the second pixel group ($C_{n-1}$, $C_n$, $C_{n+1}$) fill ($A_{n-1} < A_{n+1}$) and ($C_{n-1} < C_{n+1}$), using an expression (4) if a variation of the second pixel group ($C_{n-1}$, $C_n$, $C_{n+1}$) is continuous and has a sloping shape, and the first pixel group ($A_{n-1}$, $A_{n+1}$) and the second pixel group ($C_{n-1}$, $C_n$, $C_{n+1}$) fill ($A_{n-1} > A_{n+1}$) and ($C_{n-1} < C_{n+1}$), using an expression (5) if a variation of the second pixel group ($C_{n-1}$, $C_n$, $C_{n+1}$) is continuous and has a sloping shape, and the first pixel group ($A_{n-1}$, $A_{n+1}$) and the second pixel group ($C_{n-1}$, $C_n$, $C_{n+1}$) fill ($A_{n-1} > A_{n+1}$) and ($C_{n-1} > C_{n+1}$), and using an expression (6) if a variation of the second pixel group ($C_{n-1}$, $C_n$, $C_{n+1}$) is continuous and has a sloping shape, and the first pixel group ($A_{n-1}$, $A_{n+1}$) and the second pixel group ($C_{n-1}$, $C_n$, $C_{n+1}$) fill ($A_{n-1} < A_{n+1}$) and ($C_{n-1} > C_{n+1}$), $$A_n = (C_n - C_{n-1}) \times (A_{n+1} - A_{n-1}) / (C_{n+1} - C_{n-1}) + A_{n-1} \quad (3)$$

$$A_n = (C_n - C_{n-1}) \times (A_{n-1} - A_{n+1}) / (C_{n+1} - C_{n-1}) + A_{n-1} \quad (4)$$

$$A_n = (C_n - C_{n+1}) \times (A_{n-1} - A_{n+1}) / (C_{n-1} - C_{n+1}) + A_{n+1} \quad (5)$$

$$A_n = (C_n - C_{n+1}) \times (A_{n+1} - A_{n-1}) / (C_{n-1} - C_{n+1}) + A_{n-1} \quad (6).$$

5. The image interpolation apparatus of claim 4, wherein the temporal interpolation calculator calculates several temporal interpolated pixels ($A_{n1}, \ldots, A_{nm}$) ("m" is number of the missing pixels) for the several missing pixels using an expression (11) instead of the expression (3), using an expression (12) instead of the expression (4), using an expression (13) instead of the expression (5), using an expression (14) instead of the expression (6), $$A_{n1} = (C_{n1} - C_{n-1}) \times (A_{n+1} - A_{n-1}) / (C_{n+1} - C_{n-1}) + A_{n-1}$$

$$A_{nm} = (C_{nm} - C_{n-1}) \times (A_{n+1} - A_{n-1}) / (C_{n+1} - C_{n-1}) + A_{n-1} \quad (11)$$

$$A_{n1} = (C_{n1} - C_{n-1}) \times (A_{n-1} - A_{n+1}) / (C_{n+1} - C_{n-1}) + A_{n+1}$$

$$A_{nm} = (C_{nm} - C_{n-1}) \times (A_{n-1} - A_{n+1}) / (C_{n+1} - C_{n-1}) + A_{n+1} \quad (12)$$

$$A_{n1} = (C_{n1} - C_{n+1}) \times (A_{n-1} - A_{n+1}) / (C_{n-1} - C_{n+1}) + A_{n+1}$$

$$A_{nm} = (C_{nm} - C_{n+1}) \times (A_{n-1} - A_{n+1}) / (C_{n-1} - C_{n+1}) + A_{n+1} \quad (13)$$

$$A_{n1} = (C_{n1} - C_{n+1}) \times (A_{n+1} - A_{n-1}) / (C_{n-1} - C_{n+1}) + A_{n-1}$$

$$A_{nm} = (C_{nm} - C_{n+1}) \times (A_{n+1} - A_{n-1}) / (C_{n-1} - C_{n+1}) + A_{n-1} \quad (14)$$

where, the pixels "$C_{n1}$", "$C_{nm}$" in the comparative frame are corresponding to the missing pixels "$A_{n1}$", "$A_{nm}$" of the basic frame.

6. The image interpolation apparatus of claim 1, wherein the temporal interpolation calculator calculates the temporal interpolated pixel "$A_n$"

using an expression (7) by calculating an average value of adjacent pixels ($A_{n-1}$, $A_{n+1}$) of the missing pixel in the basic frame, calculating a gradient of signal of the pixels ($C_{n-1}$, $C_n$, $C_{n+1}$) in the comparative frame, and adding the average value of the pixels ($A_{n-1}$, $A_{n+1}$) and the gradient of the pixels ($C_{n-1}$, $C_n$, $C_{n+1}$), $$A_n = (A_{n-1} + A_{n+1})/2 + ((C_n - C_{n-1}) + (C_n - C_{n+1}))/2 \quad (7).$$

7. The image interpolation apparatus of claim 6, wherein the temporal interpolation calculator calculates several temporal interpolated pixels ($A_{n1}, \ldots, A_{nm}$) ("m" is number of the missing pixels) for the several missing pixels using an expression (15) instead of the expression (7), $$A_{n1} = (A_{n-1} + A_{n+1})/2 + ((C_{n1} - C_{n-1}) + (C_{n1} - C_{n+1}))/2$$

$$A_{nm} = (A_{n-1} + A_{n+1})/2 + ((C_{nm} - C_{n-1}) + (C_{nm} - C_{n+1}))/2 \quad (15)$$

where, the pixels "$C_{n1}$", "$C_{nm}$" in the comparative frame are corresponding to the missing pixels "$A_{n1}$", "$A_{nm}$" of the basic frame.

8. The image interpolation apparatus of claim 1, wherein the temporal interpolation calculator calculates the temporal interpolated pixel "$A_n$"

using an expression (8) by calculating an average value "$A_{av}$" of at least three pixels ($A_{n-3}, A_{n-2}, A_{n-1}$) without the missing pixel in the basic frame, calculating an average value "$C_{av}$" of at least three pixels ($C_{n-3}, C_{n-2}, C_{n-1}$) without a pixel "$C_n$" corresponding to the missing pixel in the comparative frame, calculating an offset ($A_{av}-C_{av}$) by difference of between the average values "$A_{av}$", "$C_{av}$", and adding the offset to the pixel "$C_n$", $$A_{av}=(A_{n-3}+A_{n-2}+A_{n-1})/(px-1)$$

$$C_{av}=(C_{n-3}+C_{n-2}+C_{n-1})/(px-1)$$

$$A_n=C_n+(A_{av}-C_{av}) \quad (8)$$

where, "px" is number of the pixels in the basic frame (at least "4").

9. The image interpolation apparatus of claim 1, wherein each pattern matching unit includes an offset calculator, the offset calculator calculates the average value "$A_{av}$" of the basic frame inserted the temporal interpolated pixel to the missing pixel, calculates the average value "$C_{av}$" of the comparative frame, and calculates an offset ($C_{av}-A_{av}$) by difference of between the average values "$A_{av}$", "$C_{av}$".

10. The image interpolation apparatus of claim 9, wherein the pattern matching unit includes a sum calculator, the sum calculator adds the offset to the basic frame for each of the comparative frames, calculates differences between the pixels in the basic frame and the pixels in the comparative frame, and sums up the differences in order to a sum.

11. The image interpolation apparatus of claim 1, wherein the pattern matching unit further includes a first edge calculator for calculating first edge component of each pixel in the basic frame;

a second edge calculator for calculating second edge component of each pixel in the comparative frame; and a sum calculator for calculating differences of between the first and second edge components for the pixels and summing up the differences in absolute value to obtain an edge sum.

12. The image interpolation apparatus of claim 11, wherein the first and second edge calculators calculate the first and second edge components by a first derivation filter or a second derivation filter.

13. An image interpolation apparatus formed by connecting contact image sensors to interpolate a missing pixel, each of the contact image sensors being formed by arranging scan elements in a line, the missing pixel existing between the contact image sensors, comprising:

an extracting unit for extracting pixels around the missing pixels in order to form a basic frame and comparative frames, the basic frame being formed by at least three pixels including the missing pixel, the missing pixel being located at a head or tail of the pixels in the basic frame, each of the comparative frames including the same number of the pixels as the basic frame, wherein at least one pixel of the pixels in one comparative frame does not overlap the pixels in the other comparative frames;

temporal interpolation calculators, each temporal interpolation calculator corresponding to each of the comparative frames, and calculating a temporal interpolated pixel for each of the comparative frames based on signal levels and a variation of the signal levels in terms of a first pixel group and a second pixel group, the first pixel group including adjacent pixels of the missing pixel in the basic frame, the second pixel group including an edge pixel corresponding to the missing pixel and adjacent pixels of the edge pixel in the comparative frame;

pattern matching units, each pattern matching unit corresponding to each of the comparative frames, inserting the temporal interpolated pixel of each comparative frame to the missing pixel, calculating difference between each of the pixels in the basic frame and each of the corresponding pixels in the comparative frame, and summing up the differences for all pixels in absolute value to obtain sums for all comparative frames respectively;

a minimum detection unit for selecting a minimum sum among the sums outputted from the pattern matching units;

a linear interpolation unit for calculating a linear interpolated pixel according to a gradient of the pixels which exist in both sides of the missing pixel; and a switching unit outputting the temporal interpolated pixel from the minimum detection unit as a final interpolated pixel if the minimum sum from the minimum detection unit is smaller than a threshold, and outputting the linear interpolated pixel from the linear interpolation unit as the final interpolated pixel, if the minimum sum from the minimum detection unit is larger than the threshold.

14. An image interpolation apparatus formed by connecting contact image sensors to interpolate a missing pixel, each of the contact image sensors being formed by arranging scan elements in a line, the missing pixel existing between the contact image sensors, comprising:

an extracting unit for extracting pixels around the missing pixels in order to form a basic frame and comparative frames, the basic frame being formed by at least three pixels including the missing pixel, the missing pixel being located at a head or tail of the pixels in the basic frame, each of the comparative frames including the same number of the pixels as the basic frame, wherein at least one pixel of the pixels in one comparative frame does not overlap the pixels in the other comparative frames;

temporal interpolation calculators, each temporal interpolation calculator corresponding to each of the comparative frames, and calculating a temporal interpolated pixel for each of the comparative frames based on signal levels and a variation of the signal levels in terms of a first pixel group and a second pixel group, the first pixel group including adjacent pixels of the missing pixel in the basic frame, the second pixel group including an edge pixel corresponding to the missing pixel and adjacent pixels of the edge pixel in the comparative frame;

pattern matching units, each pattern matching unit corresponding to each of the comparative frames, inserting the temporal interpolated pixel of each comparative frame to the missing pixel, calculating difference of between each of the pixels in the basic frame and each of the corresponding pixels in the comparative frame, and summing up the differences for all pixels in absolute value to obtain sums for all comparative frames respectively;

a minimum detection unit for selecting a minimum sum among the sums outputted from the pattern matching units;

a linear interpolation unit for calculating a linear interpolated pixel according to a gradient of the pixels which exist in both sides of the missing pixel;

a level difference calculator calculating an average value of the pixels which exist in one side of the missing pixel and another average value of the pixels which exist in another side of the missing pixel, and calculating and outputting difference of the average values as a difference of signal levels; and a switching unit outputting the temporal interpolated pixel from the minimum detection unit as a final interpolated pixel if the difference of the signal levels is smaller than a threshold, and outputting the linear interpolated pixel from the linear interpolation unit as the final interpolated pixel, if the difference of the signal levels is larger than the threshold.

15. A method for interpolating a missing pixel of an image obtained from connected contact image sensors, each of the contact image sensors being formed by arranging scan elements in a line, the missing pixel existing between the contact image sensors, comprising:

extracting pixels around the missing pixels in order to form a basic frame and comparative frames, the basic frame being formed by at least three pixels including the missing pixel, the missing pixel being located at a head or tail of the pixels in the basic frame, each of the comparative frames including the same number of the pixels as the basic frame, wherein at least one pixel of the pixels in one comparative frame does not overlap the pixels in the other comparative frames;

calculating a temporal interpolated pixel for each of the comparative frames based on signal levels and a variation of the signal levels in terms of a first pixel group and a second pixel group, the first pixel group including adjacent pixels of the missing pixel in the basic frame, the second pixel group including an edge pixel corresponding to the missing pixel and adjacent pixels of the edge pixel in the comparative frame;

inserting the temporal interpolated pixel of each comparative frame to the missing pixel, calculating a difference between each of the pixels in the basic frame and each of the corresponding pixels in the comparative frame, and summing up the differences for all pixels in absolute value to obtain sums for all comparative frames respectively; and outputting the temporal interpolated pixel having a minimum sum among the sums as a final interpolated pixel.

16. The method of claim 15, wherein in a case where the temporal interpolated pixel is "$A_n$" the temporal interpolated pixel "$A_n$" is calculated using an expression (1) if a variation of the second pixel group ($C_{n-1}$, $C_n$, $C_{n+1}$) is not continuous and has a concavo-convex shape, and a signal level of the second pixel group ($C_{n-1}$, $C_n$, $C_{n+1}$) is larger than the signal level of the first pixel group ($A_{n-1}$, $A_{n+1}$), and using an expression (2) if a variation of the second pixel group ($C_{n-1}$, $C_n$, $C_{n+1}$) is not continuous and has a concavo-convex shape, and a signal level of the second pixel group ($C_{n-1}$, $C_n$, $C_{n+1}$) is smaller than the signal level of the first pixel group ($A_{n-1}$, $A_{n+1}$), $$A_n = C_n \times (A_{n-1} + A_{n+1})/(C_{n-1} + C_{n+1}) \tag{1}$$

$$A_n = (C_n + (A_{n-1} + A_{n+1})/2) \times (A_{n-1} + A_{n+1})/(C_{n-1} + C_{n+1} + A_{n-1} + A_{n+1}) \tag{2}$$

17. The method of claim 16, wherein several temporal interpolated pixels ($A_{n1}$, $A_{nm}$) ("m" is number of the missing pixels) for several missing pixels are calculated using an expression (9) instead of the expression (1), and using an expression (10) instead of the expression (2), $$A_{n1} = C_{n1} \times (A_{n-1} + A_{n+1})/(C_{n-1} + C_{n+1})$$

$$A_{nm} = C_{nm} \times (A_{n-1} + A_{n+1})/(C_{n-1} + C_{n+1}) \tag{9}$$

$$A_{n1} = (C_{n1} + (A_{n-1} + A_{n+1})/2) \times (A_{n-1} + A_{n+1})/(C_{n-1} + C_{n+1} + A_{n-1} + A_{n+1})$$

$$A_{nm} = (C_{nm} + (A_{n-1} + A_{n+1})/2) \times (A_{n-1} + A_{n+1})/(C_{n-1} + C_{n+1} + A_{n-1} + A_{n+1}) \tag{10}$$

where, the pixels "$C_{n1}$", "$C_{nm}$" in the comparative frame are corresponding to the missing pixels "$A_{n1}$", "$A_{nm}$" of the basic frame.

18. The method of claim 15, wherein in a case where the temoral interpolated pixel is "$A_n$" the temporal interpolated pixel "$A_n$" is calculated using an expression (3) if a variation of the second pixel group ($C_{n-1}$, $C_n$, $C_{n+1}$) is continuous and has a sloping shape, and the first pixel group ($A_{n-1}$, $A_{n+1}$) and the second pixel group ($C_{n-1}$, $C_n$, $C_{n+1}$) fill ($A_{n-1} < A_{n+1}$) and ($C_{n-1} < C_{n+1}$), using an expression (4) if a variation of the second pixel group ($C_{n-1}$, $C_n$, $C_{n+1}$) is continuous and has a sloping shape, and the first pixel group ($A_{n-1}$, $A_{n+1}$) and the second pixel group ($C_{n-1}$, $C_n$, $C_{n+1}$) fill ($A_{n-1} > A_{n+1}$) and ($C_{n-1} < C_{n+1}$), using an expression (5) if a variation of the second pixel group ($C_{n-1}$, $C_n$, $C_{n+1}$) is continuous and has a sloping shape, and the first pixel group ($A_{n-1}$, $A_{n+1}$) and the second pixel group ($C_{n-1}$, $C_n$, $C_{n+1}$) fill ($A_{n-1} > A_{n+1}$) and ($C_{n-1} > C_{n+1}$), and using an expression (6) if a variation of the second pixel group ($C_{n-1}$, $C_n$, $C_{n+1}$) is continuous and has a sloping shape, and the first pixel group ($A_{n-1}$, $A_{n+1}$) and the second pixel group ($C_{n-1}$, $C_n$, $C_{n+1}$) fill ($A_{n-1} < A_{n+1}$) and ($C_{n-1} > C_{n+1}$), $$A_n = (C_n - C_{n-1}) \times (A_{n+1} - A_{n-1})/(C_{n+1} - C_{n-1}) + A_{n-1} \tag{3}$$

$$A_n = (C_n - C_{n-1}) \times (A_{n-1} - A_{n+1})/(C_{n+1} - C_{n-1}) + A_{n-1} \tag{4}$$

$$A_n = (C_n - C_{n+1}) \times (A_{n-1} - A_{n+1})/(C_{n-1} - C_{n+1}) + A_{n+1} \tag{5}$$

$$A_n = (C_n - C_{n+1}) \times (A_{n+1} - A_{n-1})/(C_{n-1} - C_{n+1}) + A_{n-1} \tag{6}$$

19. The method of claim 18, wherein several temporal interpolated pixels ($A_{n1}$, ..., $A_{nm}$) ("m" is number of the missing pixels) for several missing pixels are calculated using an expression (11) instead of the expression (3), using an expression (12) instead of the expression (4), using an expression (13) instead of the expression (5), using an expression (14) instead of the expression (6), $$A_{n1} = (C_{n1} - C_{n-1}) \times (A_{n+1} - A_{n-1})/(C_{n+1} - C_{n-1}) + A_{n-1}$$

$$A_{nm} = (C_{nm} - C_{n-1}) \times (A_{n+1} - A_{n-1})/(C_{n+1} - C_{n-1}) + A_{n-1} \tag{11}$$

$$A_{n1} = (C_{n1} - C_{n-1}) \times (A_{n-1} - A_{n+1})/(C_{n+1} - C_{n-1}) + A_{n+1}$$

$$A_{nm} = (C_{nm} - C_{n-1}) \times (A_{n-1} - A_{n+1})/(C_{n+1} - C_{n-1}) + A_{n+1} \tag{12}$$

$$A_{n1} = (C_{n1} - C_{n+1}) \times (A_{n-1} - A_{n+1})/(C_{n-1} - C_{n+1}) + A_{n+1}$$

$$A_{nm} = (C_{nm} - C_{n+1}) \times (A_{n-1} - A_{n+1})/(C_{n-1} - C_{n+1}) + A_{n+1} \tag{13}$$

$$A_{n1} = (C_{n1} - C_{n+1}) \times (A_{n+1} - A_{n-1})/(C_{n-1} - C_{n+1}) + A_{n-1}$$

$$A_{nm} = (C_{nm} - C_{n+1}) \times (A_{n+1} - A_{n-1})/(C_{n-1} - C_{n+1}) + A_{n-1} \tag{14}$$

where, the pixels "$C_{n1}$", "$C_{nm}$" in the comparative frame are corresponding to the missing pixels "$A_{n1}$", "$A_{nm}$" of the basic frame.

20. The method of claim 15, wherein in a case where the temporal interpolated pixel is "$A_n$", the temporal interpolated pixel "$A_n$" is calculated using an expression (7) by calculating an average value of adjacent pixels ($A_{n-1}, A_{n+1}$) of the missing pixel in the basic frame, calculating a gradient of signal of the pixels ($C_{n-1}, C_n, C_{n+1}$) in the comparative frame, and adding the average value of the pixels ($A_{n-1}, A_{n+1}$) and the gradient of the pixels ($C_{n-1}, C_n, C_{n+1}$), $$A_n = (A_{n-1} + A_{n+1})/2 + ((C_n - C_{n-1}) + (C_n - C_{n+1}))/2 \quad (7).$$

21. The method of claim 20, wherein several temporal interpolated pixels ($A_{n1}, \ldots, A_{nm}$) ("m" is number of the missing pixels) for several missing pixels are calculated using an expression (15) instead of the expression (7), $$A_{n1} = (A_{n-1} + A_{n+1})/2 + ((C_{n1} - C_{n-1}) + (C_{n1} - C_{n+1}))/2$$

$$A_{nm} = (A_{n-1} + A_{n+1})/2 + ((C_{nm} - C_{n-1}) + (C_{nm} - C_{n+1}))/2 \quad (15)$$

where, the pixels "$C_{n1}$", "$C_{nm}$" in the comparative frame are corresponding to the missing pixels "$A_{n1}$", "$A_{nm}$" of the basic frame.

22. The method of claim 15, wherein in a case where the temporal interpolated pixel is "$A_n$", the second temporal interpolated pixel "$A_n$" is calculated using an expression (8) by calculating an average value "$A_{av}$" of at least three pixels ($A_{n-3}, A_{n-2}, A_{n-1}$) without the missing pixel in the basic frame, calculating an average value "$C_{av}$" of at least three pixels ($C_{n-3}, C_{n-2}, C_{n-1}$) without a pixel "$C_n$" corresponding to the missing pixel in the comparative frame, calculating an offset ($A_{av} - C_{av}$) by difference of between the average values "$A_{av}$", "$C_{av}$", and adding the offset to the pixel "$C_n$", $$A_{av} = (A_{n-3} + A_{n-2} + A_{n-1})/(px - 1)$$

$$C_{av} = (C_{n-3} + C_{n-2} + C_{n-1})/(px - 1)$$

$$A_n = C_n + (A_{av} - C_{av}) \quad (8)$$

where, "px" is number of the pixels in the basic frame (at least "4").

23. The method of claim 15, wherein in a case where the average value of the basic frame inserted temporal interpolated pixel to the missing pixel is $A_{av}$", the average value "$A_{av}$" is calculated the average value "$C_{av}$" of the comparative frame is calculated, and an offset ($C_{av} - A_{av}$) is calculated from a difference between the average values "$A_{av}$", "$C_{av}$".

24. The method of claim 23, wherein the offset is added to the basic frame for each of the comparative frames, differences between the pixels in the basic frame and the pixels in the comparative frame are calculated, and the differences are summed up in order to obtain a sum.

25. The method of claim 15, wherein a first edge component of each pixel in the basic frame is calculated, a second edge component of each pixel in the comparative frame is calculated, differences between the first and second edge components for the pixels are calculated, and the differences in absolute value are summed up to obtain an edge sum.

* * * * *